(12) United States Patent
Adelson

(10) Patent No.: US 12,295,430 B1
(45) Date of Patent: May 13, 2025

(54) IMPACT ABSORBING COMPOSITE MATERIAL

(71) Applicant: Jeremy Adelson, Wauwatosa, WI (US)

(72) Inventor: Jeremy Adelson, Wauwatosa, WI (US)

( * ) Notice: Subject to any disclaimer, the term of this patent is extended or adjusted under 35 U.S.C. 154(b) by 0 days.

(21) Appl. No.: 18/388,847

(22) Filed: Nov. 12, 2023

(51) Int. Cl.
*A41D 13/01* (2006.01)
*A41D 13/015* (2006.01)
*B32B 5/02* (2006.01)
*B32B 5/10* (2006.01)

(52) U.S. Cl.
CPC ............ *A41D 13/015* (2013.01); *B32B 5/024* (2013.01); *B32B 5/026* (2013.01); *B32B 5/10* (2013.01); *B32B 2260/021* (2013.01); *B32B 2262/0207* (2013.01); *B32B 2262/10* (2013.01); *B32B 2437/00* (2013.01)

(58) Field of Classification Search
CPC ...... A41D 13/015; B32B 5/024; B32B 5/026; B32B 5/10; B32B 2260/021; B32B 2262/0207; B32B 2262/10; B32B 2437/00
See application file for complete search history.

(56) References Cited

U.S. PATENT DOCUMENTS

| | | | |
|---|---|---|---|
| 3,729,372 A | 4/1973 | Matchen et al. | |
| 4,179,979 A | 12/1979 | Cook et al. | |
| 5,960,470 A | 10/1999 | Bachner, Jr. | |
| 6,203,908 B1 | 3/2001 | Cohen | |
| 6,651,543 B2 | 11/2003 | Park | |
| 7,117,780 B2 | 10/2006 | Cohen | |
| 8,220,378 B2 | 7/2012 | Gamache et al. | |
| 8,254,319 B2 | 8/2012 | Neal | |
| 8,746,122 B1 | 6/2014 | Roland et al. | |
| 8,789,454 B1 | 7/2014 | Roland et al. | |
| 9,297,617 B2 | 3/2016 | Roland et al. | |
| 9,383,172 B1* | 7/2016 | Gamache | F41H 5/0492 |
| 9,612,091 B1* | 4/2017 | Blair | F41H 5/0492 |
| 10,869,513 B2* | 12/2020 | Stegmaier | A41D 19/0096 |
| 2004/0020353 A1* | 2/2004 | Ravid | F41H 5/0414 89/36.02 |
| 2004/0083880 A1* | 5/2004 | Cohen | F41H 5/0414 89/36.02 |

(Continued)

OTHER PUBLICATIONS

Wikipedia, Dragon Skin, https://en.wikipedia.org/wiki/Dragon_Skin (as available on Jul. 16, 2020), 8 pages.

(Continued)

*Primary Examiner* — David M Upchurch

(57) ABSTRACT

A composite material for absorbing forces applied to a face of the material comprises a first plurality of shaped solids having a substantially polygonal cross-section with a number of sides (X); a second plurality of shaped solids having a base and a top, wherein the base has a substantially polygonal cross-section with X number of sides and the top has a substantially polygonal cross-section with X number of sides that is larger than the polygonal cross-section of the base and is rotated X/180 degrees about an axis shared by the base and top; wherein the top of a shaped solid of the second plurality extends over a shaped solid of the first plurality; and wherein the top may comprise a different material than the base. One of the first and second pluralities of solids may be connected to a material layer, which may be a resilient material layer.

20 Claims, 23 Drawing Sheets

(56) References Cited

U.S. PATENT DOCUMENTS

| | | |
|---|---|---|
| 2007/0017359 A1 | 1/2007 | Gamache et al. |
| 2012/0174759 A1 | 7/2012 | Gallo et al. |
| 2012/0312150 A1 | 12/2012 | Gamache et al. |
| 2014/0150154 A1 | 6/2014 | Aquino |
| 2015/0377592 A1 | 12/2015 | Roland et al. |
| 2017/0241747 A1* | 8/2017 | Ganor ................ B32B 5/18 |

OTHER PUBLICATIONS

McLaurin, Berl, Dual-Hardness Titanium Body Armor for Concealable Applications, Master's Thesis Jun. 2018, Naval Postgraduate School, Monterey, CA USA, 87 pages.

* cited by examiner

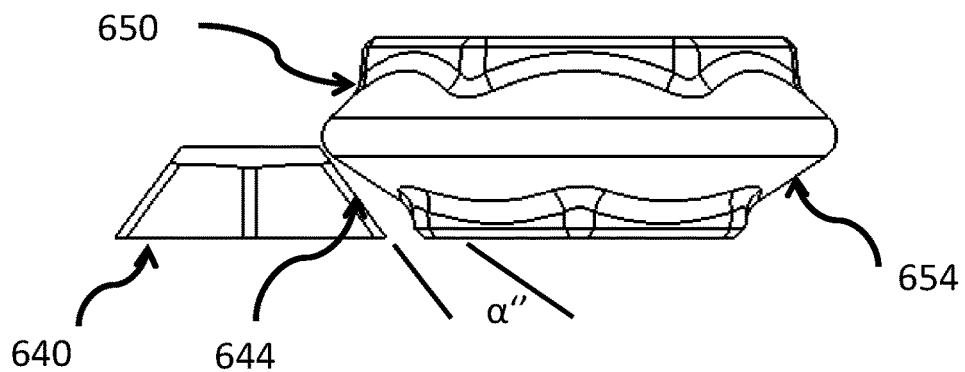
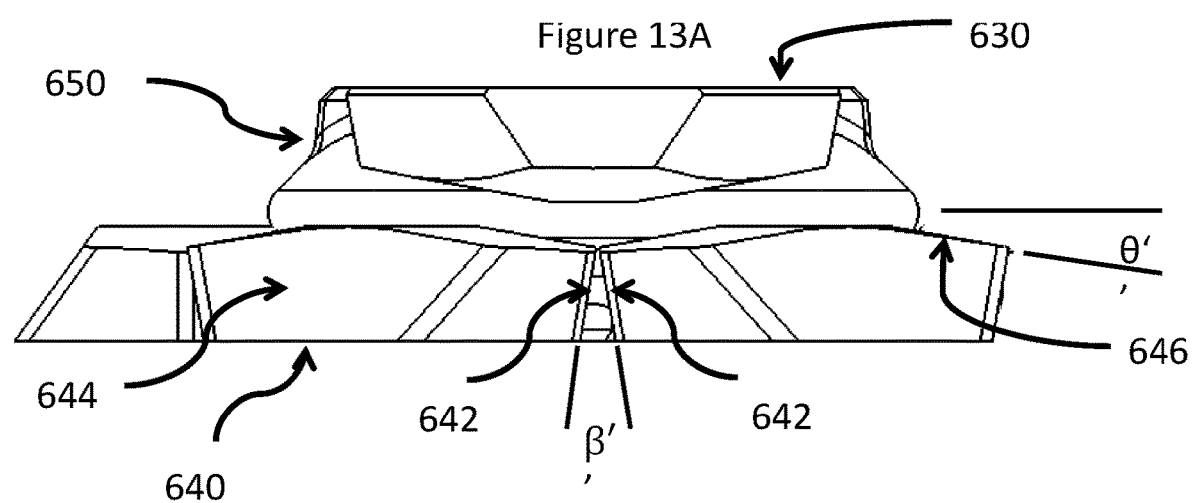
Figure 13A
Figure 13B

IMPACT ABSORBING COMPOSITE MATERIAL

APPLICATION PRIORITY

This application claims priority to application Ser. No. 17/156,596 filed on Jan. 24, 2021 and to Application Ser. No. 62/965,992 filed on Jan. 26, 2020, the entire contents of which are incorporated by reference as if restated fully herein.

BACKGROUND

This invention relates to a flexible material designed to absorb impact forces applied to a face of the material and may be used in personal body armor and/or sports equipment to prevent or minimize the penetration of projectiles and/or to distribute impact forces. In particular, the invention relates to an arrangement of shaped solids in a composite structure that can deform out of plane so as to conform to the shape of a body part and allow free movement of that body part while at the same time providing protection from impact forces applied to a surface of the composite structure.

Traditional impact absorbing materials rely upon multiple layers of high tensile strength fibers (e.g., aramid or spun fibers of ultra-high molecular weight polyethylene ("UHMW-PE") to absorb and disperse an applied impact force. Other traditional impact absorbing materials rely on the compressive properties of a material and collapse in response to an applied impact (e.g. foams or cellular structural plastic forms, such as the tubular cellular material made and sold by Koroyd SARL).

These traditional impact absorbing materials have certain limitations. For example, in the field of personal body armor in order to stop projectile penetration and/or to provide sufficient impact absorption to prevent blunt force trauma such body armor must use many layers of fiber material, which at increased thickness becomes bulky and relatively inflexible. Because of the required thickness and relative inflexibility of such personal body armor, in many instances such body armor protects only limited areas of a person's body and does not provide protection for areas of the body, including, for example, arms, shoulders, waist, neck and adjacent areas, leaving the wearer unprotected from projectile threats. Moreover, even with many multiple layers such body armor is generally insufficient to withstand the impact and penetration of larger and/or higher velocity projectiles, like those fired from rifles. As a result, and to provide protection from larger and/or higher velocity projectiles, rigid plates of hardened material (typically of steel or ceramic materials) must be used in addition to the body armor of many layers of fiber material. The addition of such rigid plates means that such body armor is no longer flexible in those regions having a rigid plate. In addition, the suitable protection from larger and/or higher velocity projectiles is limited only to those areas protected by the additional rigid plate(s). Even without the addition of rigid plates, typical personal body armor as described above does not readily conform to the contours of the human body and is generally cumbersome and bulky, and impedes natural movements like bending or twisting and is difficult to conceal.

Other traditional impact absorbing materials, like foams, do not disperse an applied impact, or only minimally disperse an applied impact, and instead rely on the compression of the material to absorb such impact. In some instances, foam materials like those used in some bicycle helmets fracture upon impact, as part of the way in which impact force are absorbed. Accordingly, such materials and devices made of such materials are limited to a single impact and not useable thereafter. Other materials like those made and sold by Koroyd disperse an applied impact force through the collapse of a series of adjacent cellular structures. Those materials also generally undergo permanent deformation in response to an applied force and have limited, if no, potential subsequent use after sustaining impact.

SUMMARY

The present invention relates to a composite material that allows for flexibility out of plane while providing improved impact resistance to forces applied to the surface of the material and methods for making the same. Embodiments of a composite material having a plurality of shaped solids arranged such that forces applied to a surface of the material are redirected in a direction normal to or at least partially normal to the direction of applied force. The plurality of shaped solids of the composite material may be arranged in one or more layers, with, for example, one layer proximate a body/surface to be protected, a second layer distal to such body/surface, and a third layer arranged between the first and second layers. The plurality of shaped solid of each such layer may be further arranged such that a force applied to a surface of the composite material is at least partially redirected by the interaction of a shaped solid of one layer with one or more shaped solids of one or more other layers. The composite material may also include a sheet layer which may be a fabric layer (having elastic properties or not), or an elastomeric or layer of resilient material (which may have fiber reinforcement), or a fiber or filament reinforced layer with woven and/or fused fibers or filaments, including, for example, aramid fibers, UHMW-PE filaments and metal (e.g., drawn titanium) to which the shaped solids may be attached to, embedded in, or by which they are otherwise contained or connected to. In some embodiments the shaped solids may be retained between layers of fabric or sheet materials that are laminated to one another by various process including by adhesive, flame lamination or ultrasonic welding. In other embodiments the shaped solids may be molded, partially or entirely, into an elastomeric, resilient material or polymer material. In such embodiments, the shaped solids and/or the elastomeric or resilient material may be attached to or include one or more fabric layers or sheets using process including co-molding, adhesive bonding, ultrasonic welding thermal bonding, or by mechanical attachment, including snap or barb fit. In other embodiments the space within the composite material between arranged shaped solids may be filed with a material that allows the composite material to flex out of plane, but retains the shaped solids in close proximity to one another. Such material may include a resilient material, a foamed material, a fiber reinforced material, synthetic or natural materials (including for example, natural rubbers, mycelium based materials, including, for example, MycoFlex™, collagen based materials such as Zoa, and the like).

The shaped solids may be made out of any suitable material for the intended application and may be made of metals, ceramics, metal and composite matrixes, polymers and combinations thereof. For example, in personal body armor applications, the shaped solids may be made of metals including metals that have been hardened or include hardened layers (e.g., case hardened or hardened surface layers formed from carbides, nitrides or equivalents), ceramics including suitable oxides, carbide, nitrides and combinations thereof, for example, aluminum oxide $Al_2O_3$, silicon carbide SiC, boron carbide $B_4C$, titanium carbide TiC, titanium nitride TiN, silicon nitride $Si_3N_4$, silicon-aluminum-oxide-nitrides sometimes commercially known as Sialon, zirconia $ZrO_2$—stabilized by yttria $Y_2O_3$, other ceramics having similar properties, metal matrixes having a ceramic materials therein, or ceramics like those mentioned previously in a metal or composite matrix. In some embodiments the shaped solids may be made of multiple materials, including for example layers of materials having different relative hardness and fracture toughness (e.g., a ceramic/metal layered assembly, a ceramic/metal/polymer layered assembly, a ceramic or metal layered assembly having one or more polymer layers and/or polymer molded over a part of the laminate). By way of additional example, in the sporting industry, the shaped solids may be made of aluminum, zinc or magnesium and alloys or metal matrices of the same and polymers, such as, for example, Nylon, PTFE, ABS, including polymers that are fiber or particle reinforced. The shaped solids may be hollow, partially hollow, a filled hollow or partial hollow, and/or made of a combination of materials (e.g., one material coating another, or one material within another). In different embodiments shaped solids of different materials may be used in conjunction with one another (i.e., some shaped solids may be of one material and other shaped solids may be of a second material). The above exemplary materials identified as suitable for shaped solids may have hardness values that are relatively higher than other materials such as elastomeric materials, silicones, urethanes, and rubbers that may also be used in solid shapes (for example, between materials identified above as having relatively high hardness). Moreover, some of the above exemplary materials suitable for shaped solids may have hardness values that are relatively higher than other materials identified as suitable for shaped solids. Some embodiments may include a shaped solids of two or more ceramic materials, for example, aluminum oxide (having a Vickers hardness value of approximately 1500-2000, depending on grade) and yttria stabilized zirconia (having a Vickers hardness of approximately 1200) separated and/or joined by a polymer layer (e.g., urethane). In such example, both ceramic materials have relatively high hardness values compared with other materials (including the urethane/polymer layer), and the aluminum oxide has a relatively higher hardness than the yttria stabilized zirconia.

In embodiments, a shaped solid may be formed from two or more solids separated and/or joined together by a material with relatively high fracture toughness, for example, an elastomeric, resilient or a metal or polymer material. By way of example, a shaped solid maybe formed from two portions of material having a relatively high hardness (like the materials described above suitable for the shaped solids and application of the composite material) that are joined together and/or separated by material having relatively high fracture toughness. In such embodiments, the shaped solid is itself a composite material and exhibits benefits attributable to its different materials and construction. In such example, if the two portions (a first and a second) are of a ceramic material, and upon impact by a projectile the first portion of the shaped solid may provide the requisite hardness to deflect and/or absorb impact energy by causing the projectile to fracture. This initial absorption of impact energy may also lead to the first portion to fracture; however, in such embodiment, where the second portion is separated by a layer of material with high facture toughness the fracture initiated in the first portion may not propagate to the second portion.

As described herein, sheet, fabric, or material layers may include knit, woven or uni-directional fabric or layers of natural or synthetic materials and fibers (e.g., Nylon, Kevlar, Spectra, Dyneema, glass fiber, etc.) including fabrics having extensible properties (e.g., Spandura®). Elastomeric or resilient material may be made out of any suitable material for the intended application and may include any polymer, rubber, silicone, urethane, ionomers (including, for example Surlyn®), neoprene (including breathable neoprene such as Ventiprene), hybrids or blends of any of the foregoing, or other materials, having similar properties. Resilient materials may also include foamed materials, a fiber reinforced material (including those with continuous or non-continuous fibers), synthetic or natural materials (including for example, natural rubbers, mycelium based materials, including, for example, MycoFlex™, collagen based materials such as Zoa, and the like). Material layers described herein may include openings or features molded therein to facilitate alignment, attachment and/or joining with shaped solids described herein. In addition, material layers described herein may include regions of greater and/or reduced thickness and/or regions or selective reinforcement arranged to provide impact and/or penetration resistance and/or to facilitate flexibility/bending of the material layer at desired location.

The composite material may also include additional layers of material, including one or more layers of additional fiber materials (e.g., Kevlar, Spectra, Dyneema, glass fiber, etc.), elastomeric sheet materials (fiber reinforced or without fiber reinforcement), and molded sheet materials.

BRIEF DESCRIPTION OF THE DRAWINGS

FIGS. 10A-15 are views of an additional embodiment.
FIGS. 16-19B-39 are views of an additional embodiment.

DETAILED DESCRIPTION

Figure 1:
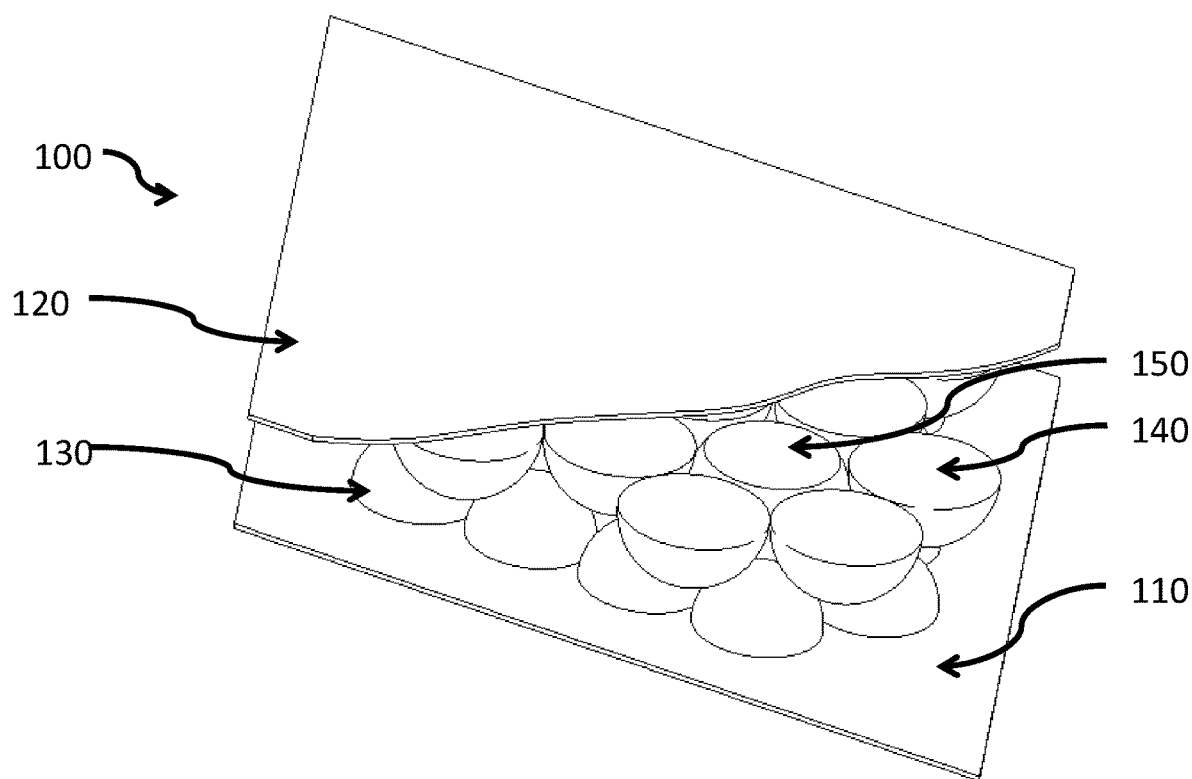
FIGS. 1-5 are views of a first embodiment.

FIG. 1 illustrates a cut-away view of an embodiment 100 of a composite material, having optional first outer layer 110 and optional second outer layer 120. Only portions of outer layers 110 and 120 are shown, as it is understood that these layers may continue in one or more directions. In addition, second outer layer 120 is shown partially cut away to provide a view of the arrangement of shaped solids 130, 140 and 150 located between outer layers 110 and 120, and also understood to continue in one or more directions. Layers 110 and 120 may be a material layer that is a fabric layer, a preformed layer of resilient material, a layer of a fabric or fiber/filament reinforced layer and/or a combination of the foregoing. Layers 110 and 120 are flexible out of plane so that they may conform to generally fit or follow the surface of a protected body part or other surface. Layers 110 and 120 having fiber reinforcement may include chopped or short fiber reinforcement, a layer or layers of uni-directional fiber reinforcement, a layer or layers of woven fiber reinforcement, or a combination of such fiber reinforcement. In addition, layers 110 and 120 may be extensible in that they may elongate in one or more directions. In some embodiments, one or both of layers 110 and 120, may include plies of uni-directional fiber reinforcement arranged at angles with respect to one another, including plies arranged at 0 degrees, 90 degrees and +/−45 degrees. In other embodiments, plies of uni-directional fiber reinforcement may include fibers arranged at 0 degrees and +/−60 degrees, and may further include fibers arranged at 90 degrees and +/−30 degrees.

A repeating pattern of first shaped solids 130 is shown in FIG. 1, which may be connected to layer 110. A repeating pattern of second shaped solids 140 is shown in FIG. 1, which may be connected to layer 120. Shaped solids 130 and 140 may be attached to first and second outer layers 110 and 120 by any suitable means, including by, for example, suitable adhesive, co-molding, ultrasonic welding, laminating, pockets in the layers, or mechanical fastening.

Figure 2:
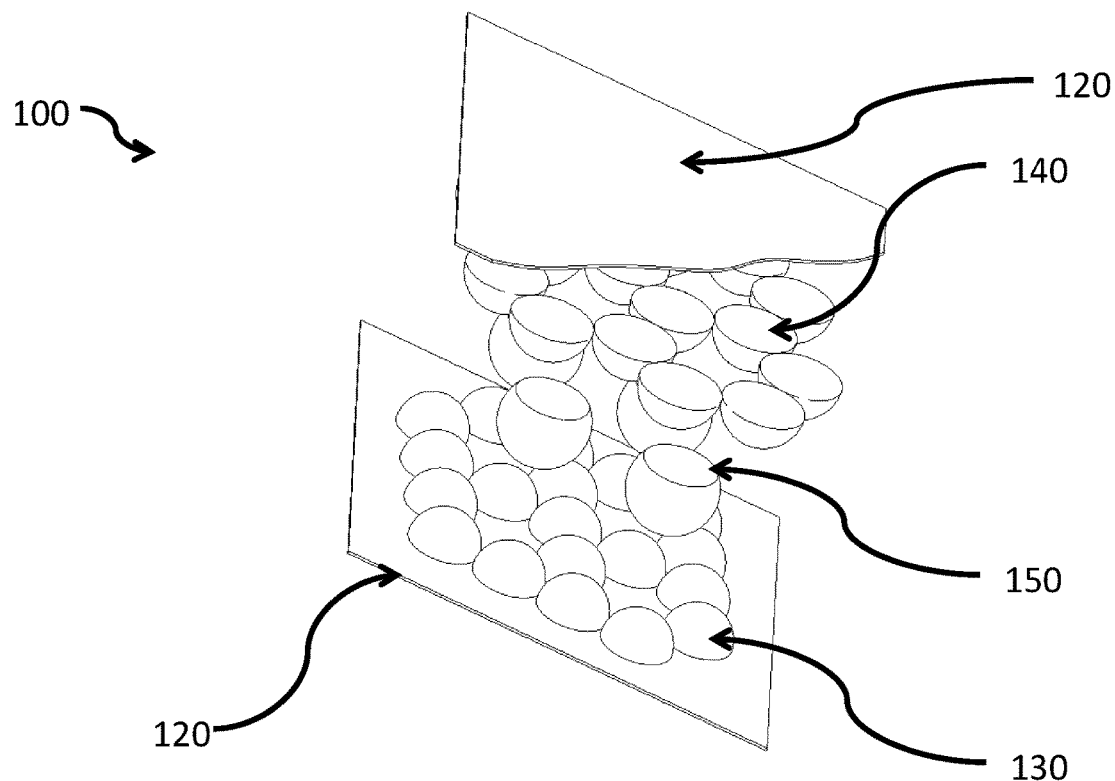

As shown, for example, in FIG. 2 the first and second shaped solids 130 and 140 are grouped in repeating patterns with six shaped solids arranged about a central open space. As shown specifically in FIG. 3, shaped solids 130 are arranged in a hexagonal pattern, roughly adjacent to one another, and such that a center of each shaped solid is located at the corners of hexagon $H_I$ (inscribed), and shaped solids 140 are arranged in a hexagonal pattern, roughly adjacent to one another, such that a center of each shaped solid is located at the corners of illustrative hexagon $H_C$ (circumscribed). As illustrated in this embodiment, illustrative hexagon $H_I$ lies inside or is inscribed in circle C (shown in dashed line), while illustrative hexagon $H_C$ lies outside or is circumscribed about circle C. As is also illustrated in FIG. 3, illustrative hexagon $H_C$ is oriented or clocked 30 degrees with respect to illustrative hexagon $H_I$, such that when the layers of repeating patterns of shaped solids 130 and 140 are arranged in close proximity with one another each shaped solid 130 is roughly aligned with the region where two (2) adjacent shaped solids 140 meet, and each shaped solid 140 is roughly aligned with the interstitial space created by three (3) adjacent shaped solids 130.

Figure 3:
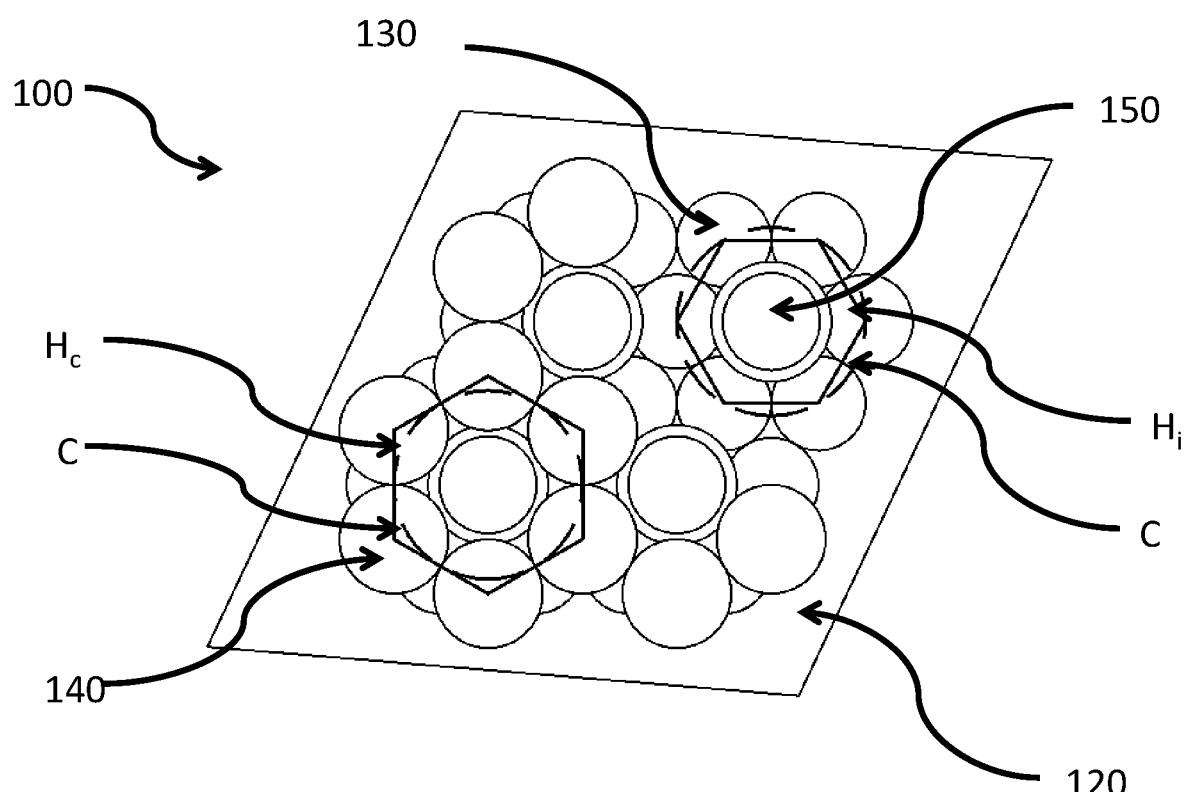

As further shown with reference to FIGS. 1-3 (FIG. 2 being an exploded view of FIG. 1), shaped solids 150 are located between the arranged shaped solids 130 and 140, and sized such that each shaped solid 150 at least partially fits within the volume created by overlaying the repeating patterns of shaped solids 130 and 140 with one another. Each of first and second solid shapes 130 and 140 have a first cross-sectional area at, near or generally proximate to an external surface of material 100, and a cross-sectional area that is reduced or smaller than the first cross-sectional area at positions in the thickness of material 100 away from the external surface and toward the opposing external surface of material 100. Solid shapes 130 and 140 may have a first cross-sectional area at, near or, off-set from a mid-plane of material 100 toward a first external surface of material 100 that is larger than a second cross-sectional area of each of shaped solids 130 and 140 that is away from said first external surface of material 100. In some embodiments, solid shapes may have a greatest cross-sectional area off-set from an external surface of the composite material in the material at a distance between an external surface of the solid shape and the mid-plane of the composite material, including, for example, a distance half-way between an external surface of the solid shape and the mid-plane of the composite material. Solid shapes 130 and 140 may include a taper and/or may be portions of spherical shapes having a greatest cross-sectional area at, near or proximate to an external surface of material and/or off-set from a mid-plane of material 100 toward an external surface of material 100 and may also have reduced cross-sectional area(s) at positions in the thickness of material 100 away from the external surfaces of material 100. In such embodiments, the repeating patterns of first and second shaped solids 130 and 140 define spaces or volumes into which portions of opposing shaped solids, respectively 140 and 130, may fit and be positioned proximate to opposing shaped solids. In addition, the repeating patterns of first and second shaped solids 130 and 140 define spaces or volumes that may accept a third shaped solid 150. Such shaped solids 150 are shaped and dimensioned, such that each shaped solid 150 is arranged adjacent and may be roughly tangent to six (6) shaped solids 130 and six (6) shaped solids 140. Each of shaped solid 150 may have a first cross-sectional area at or near a mid-plane of material 100, or offset in the thickness of material 100 from each external surface that is greater than cross-sectional areas positioned closer to each of the external surfaces of material 100. Such solid shapes 150 may include a taper and/or may be portions of spherical shapes and have tapered or partially spherical surfaces, such that solid shapes 150 may fit with in the spaces/volumes defined by opposing repeating patterns of shaped solids 130 and 150. As shown, each shaped solid 130, 140, 150 is sized so that when arranged as described herein, they are closely arranged with and/or are in contact with the respective shaped solids 130, 140, 150 that they are adjacent to. The shaped solids 150 and/or the surfaces of shaped solid proximate to layers 110 and 120 may be connected to layers 110 and 120 in the same manner as described above with shaped solids 130 and 140.

The above described arrangement of shaped solids 130, 140 and 150 (proximate and/or tangent to their respective neighboring shaped solid(s)), provides a high volumetric percentage of solid material (i.e., a high packing density, of at least approximately 80%) while still allowing flexibility of the composite material 100 out of plane with the freedom to flex or articulate in multiple directions. This combination of properties results in a composite material 100, that when, for example, utilized in protective garments, allows for great mobility, while also affording impact resistance to, for example projectiles comparable to that of rigid/plate body armor. The above described arrangement of shaped solids 130, 140, 150 results in a structure with at least one layer of solid material (of shaped solids 130, 140, 150) that prevents a projectile or other impact (e.g., bladed or pointed weapon attack, such as a knife attack) from passing through the thickness composite material 100 and/or deflects the trajectory of such projectile or impact. As shown, the arrangement of shaped solids 130, 140, 150 and their respective described cross-sectional areas generally results in two or more layers of solid material (of shaped solids 130, 140, 150) that block and/or deflect impact applied to a surface of composite material 100.

For the embodiment described above, having roughly spheroidal shaped solids (hemispheres, partial spheres, truncated spheres, and may be applied also to hexagonal prisms, truncated/tapered hexagonal prisms, truncated/tapered triangular prisms, etc.) 130, 140, 150, it has been determined that the following approximate dimensions and positions of the shaped solids (as a function of the diameter of circle C, which is a circle that passes through the centers of six (6) solid shapes 130 when arranged in a hexagonal pattern adjacent to one another) results in the above described high packing density. Solid shapes 130, arranged at the corners of inscribed hexagon $H_I$, may have a diameter of roughly 0.50 C and are positioned radially from the center of C at a distance of 0.5 C at 60 degree intervals. Solid shapes 140, arranged at the corners of circumscribed hexagon $H_C$, may have a diameter of roughly 0.577 C and are positioned radially from the center of C at a distance of roughly 0.577 C at 60 degree intervals, clocked 30 degrees with respect to the orientation of solid shapes 130. In the depicted embodiment, where solid shapes 130 and 140 are depicted as hemispheres, the combined thickness of the layers of arranged shaped solids 130 and 140 may be 0.455 C, when nested together as depicted in FIG. 1. The thickness of composite material 100 is less than the combined thickness of each layer of arranged shaped solids 130 and 140, which would be approximately 0.538 C (or roughly 13% thicker) than the depicted arrangement of FIG. 1. Shaped solid 150, as described above fits within the volume created by the nested layers of arranged shaped solids 130 and 140, and may have a diameter of 0.636 C. The major diameter of shaped solid 150 may be offset within the thickness of the composite material 100 such that the major diameter of shaped solid 150 is offset towards the shaped solids 140. Accordingly, the major diameter of shaped solid 150 may lie in a plane at approximately 0.6 of the thickness of composite material 100, when measured from the side of composite material 100 having shaped solids 130.

The actual dimensions of the solid shapes 130, 140 and 150 and their positions with respect to one another depend on the particular application of an embodiment of the composite material, which may be based on standards established for ballistic or stab resistance, such as the National Institute of Justice (NIJ) Standards 0101.06 (Ballistic Resistance of Body Armor) and 0115.00 (Stab Resistance of Personal Body Armor). Products made with composite materials of the embodiments described herein may provide different levels of body protection to different areas of the body. For example, areas protecting vital organs may be constructed to meet higher projectile resistance, whereas other areas may provide less projectile resistance. Thus, products incorporating composite material 100 may use composite materials constructed with differently dimensioned solid shapes 130, 140 and 150. Further embodiments may include composite materials with shaped solids 130, 140 and 150 that change in size (and therefore in position with respect to one another) along a length and/or width of composite material 100. In such embodiments, variation of the size of shaped solids 130, 140 and 150 along the length and/or width of composite material may allow for a contiguous composite material 100 having the desired flexibility and continuity of protective attributes, but with different levels of projectile/impact resistance in different areas.

An embodiment of composite material based having dimension C equal to 1 inch in diameter, includes shaped solids 130 with a major diameter of approximately 0.5 inch, shaped solids 140 with a major diameter of approximately 0.577 inch, shaped solids 150 with a major diameter of approximately 0.636. The thickness of such an embodiment (excluding layers 110 and 120) is approximately 0.455 inch.

Figure 4:
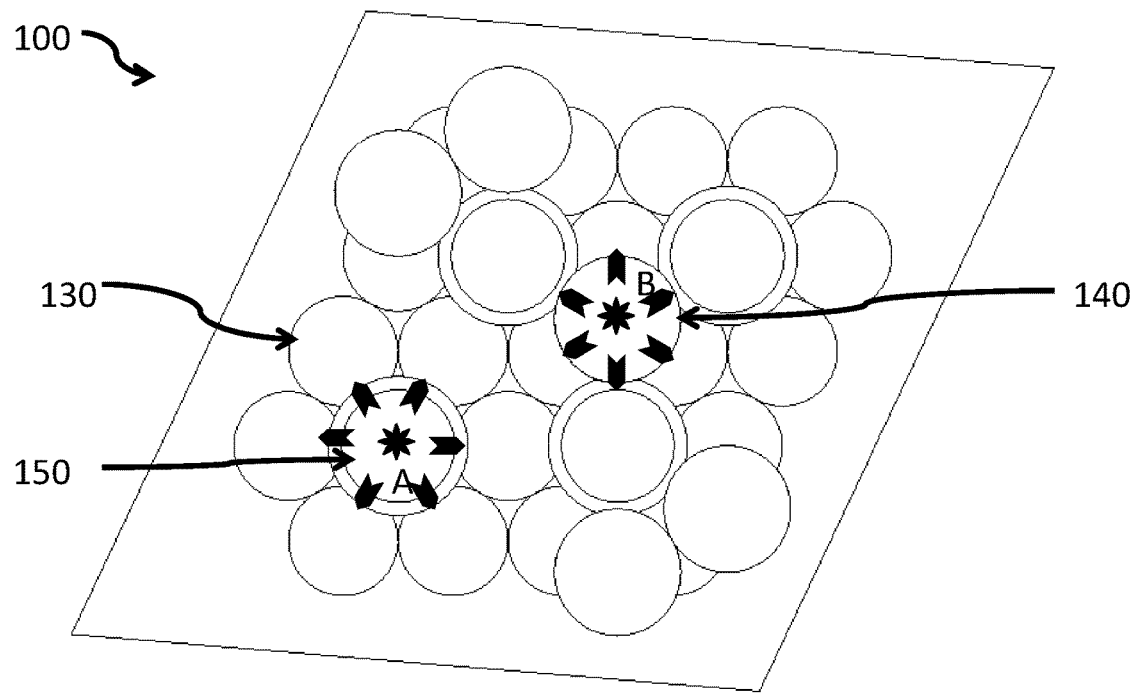
Figure 5:
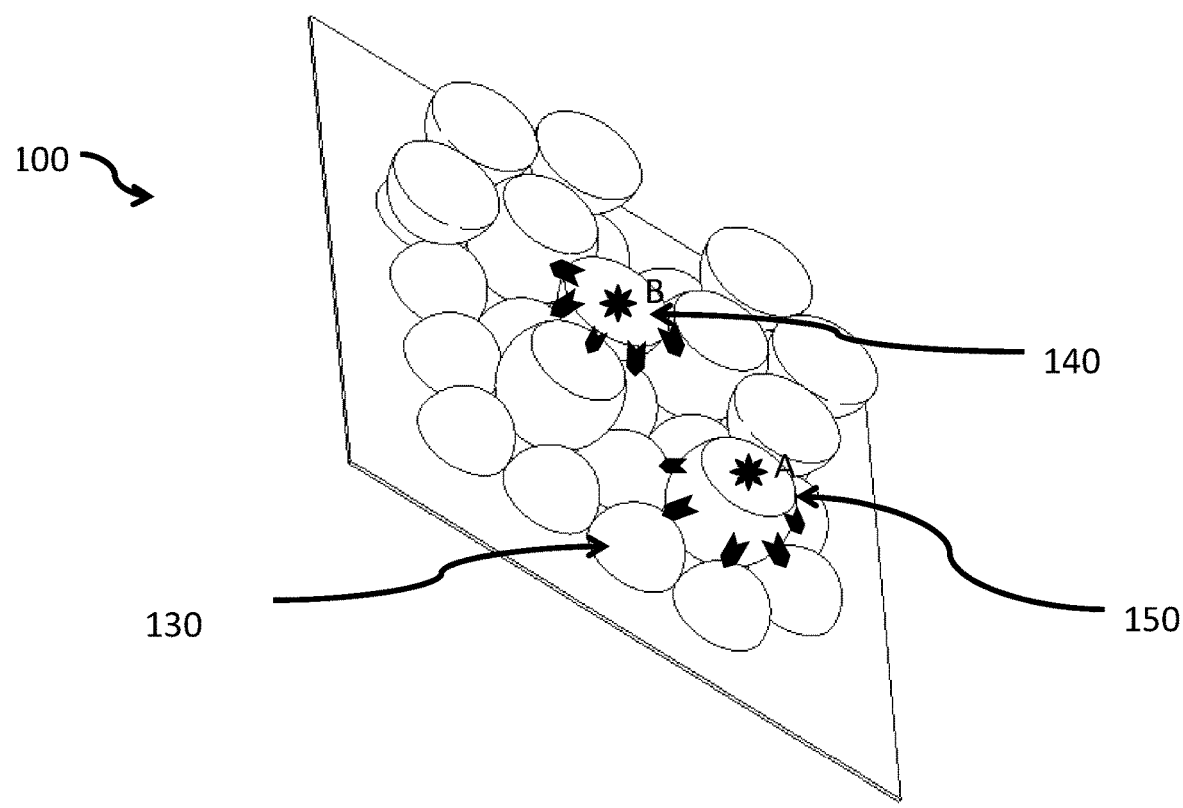

FIGS. 4 and 5, having optional layer 120 omitted for clarity, illustrate how the aforementioned arrangement of shaped solids 130, 140, and 150 dynamically respond to forces (including impact force) applied to a surface of the composite material 100. Specifically, FIGS. 4 and 5 illustrate how the arrangement of shaped solids 130, 140, and 150 distribute applied forces in two conditions, indicated with an A for a load predominately applied to a surface of shaped solid 150 that would be proximate to layer 120 or an exterior surface of material 100 and a B for a load predominately applied to a surface of shaped solid 140 that would be proximate to layer 120 or an exterior surface of material 100. In both load cases, A and B, the applied load is distributed to adjacent shaped solids as indicated by directional arrows.

In load case A, force applied to the surface of shaped solid 150 (proximate to optional layer 120) is directed through shaped solid 150 into the surrounding six (6) shaped solids 130 are adjacent shaped solid 150. The applied force is, therefore, distributed over a substantially larger surface area that the initial surface of shaped solid 150 upon which the force is initially applied. The resultant forces applied to shaped solids 130 surrounding shaped solid 150 may be further distributed to layer 110 regardless of whether shaped solids 130 is connected to layer 110. As discussed above, layer 110 may be a fiber reinforced material or fabric. In such embodiments, some of the fibers of layer 110, lying in the plane of layer 110, will therefore be loaded along their axis in tension. As opposed to existing body armor using fiber materials (Kevlar, Spectra, etc.), the fibers of which are almost entirely loaded normal to their axes with axial loading of the fibers achieved as the fibers deflect out of plane under load, the present design distributes the applied load over a greater surface area with a greater percentage of the applied load borne axially by fibers present in layer 110 without requiring deflection of those fibers out of plane. In addition, it is anticipated that some forces distributed to those shaped solids 130 immediately surrounding shaped solid 150 upon which force is initially applied will further distribute forces to the shaped solids 130 and 150 that they are in contact with, thereby further distributing the applied force over greater surface area and engaging more of layer 110 and any fibers therein.

In load case B, force applied to the surface of shaped solid 140 (proximate to optional layer 120) is directed through shaped solid 140 into the surrounding three (3) shaped solids 150 that are adjacent shaped solid 140 and into the three (3) shaped solids 130 that are adjacent to shaped solid 140. Further the distributed forces transmitted to each of shaped solids 150 are further transmitted to the six (6) shaped solids 130 to which those shaped solids 150 are adjacent to, much as described above with load cases A. The applied force is, therefore, distributed over a substantially larger surface area that the initial surface of shaped solid 140 upon which the force is initially applied. Similar to the circumstances described above with respect to load case A, the resultant forces applied to shaped solids 130 and 150 may be further distributed to layer 110 to which one of shaped solids 130 and 150 may be connected.

Accordingly, in both load cases A and B when a load is applied an exterior surface of material 100 (i.e., applied directly or indirectly to either shaped solid 140 or 150) it will be distributed by the structure of composite material 100 such that it is distributed over a larger surface area (for example of layer 100) and a portion of the applied force will be redirected to be parallel to the layers of shaped solids 130, 140 and 150 and maybe further transmitted into a material layer present in the composite material, such as for example depicted layer 110. Forces parallel to such material layer, like that of layer 110 will be resisted by the structure of layer 110, and in embodiments of layer 110 that are fiber reinforced those forces will be borne axially by fibers that are oriented longitudinally in the plane of layer 110.

While the loading scenarios described above assume that a load is applied to layer 120 or an exterior surface of material 100 and surfaces of solid shapes proximate thereto, it is understood that a load may instead be applied to the opposite surface of composite material 100 (for example, the surface of composite material 100 depicted with layer 110 and surfaces of solid shapes proximate thereto, or to such exterior surfaces regardless of whether there is a layer 110 or 120. In all such circumstances, it is understood that composite material 100 will respond to the applied load in a similar fashion as described above, with the applied load distributed by the structure and arrangement of the components of composite material 100 with similar benefits to those already described. In other embodiments, including others described herein, a composite material may include a material layer arranged within the thickness of composite material 100. In such embodiments, one or more shaped solids may be connected to and/or constrained by such intermediate material layer, and like layers 110 and 120 described, may, by virtue of the arrangement of shaped solids, resist forces applied to the surface of the material including by redirecting such forces in a direction at least partially parallel to the primary orientation of such intermediate layer.

Methods of manufacturing the composite material 100 may include making a first sub-assembly having shaped solids 130 are arranged and connected to a material layer such as layer 110. As described above shaped solids 130 may be connected to layer 110 by any suitable means, including by, for example, suitable adhesive, co-molding, ultrasonic welding, or mechanical fastening. It is also contemplated that shaped solids 130 may be connected to layer 110 by an additional layer of fabric or sheet material that is laminated to shaped solids 130 and/or layer 110, sandwiching shaped solids 130 in between. Similarly, a second sub-assembly may be made having shaped solids 140 are arranged and connected to layer 120. As described above, shaped solids 140 may be connected to layer 120 by any suitable means, including by, for example, suitable adhesive, co-molding, ultrasonic welding, pocket or mechanical fastening. It is also contemplated that shaped solids 140 may be connected to layer 120 by an additional layer of fabric or sheet material that is laminated to shaped solids 140 and/or layer 120, sandwiching shaped solids 140 in between. Shaped solids 150 may then be separately connected to one or both of layers 110 and 120 of their respecting sub-assemblies by any suitable means, including by, for example, suitable adhesive, co-molding, ultrasonic welding, or mechanical fastening, thereby joining the two sub-assemblies as composite material 100. In some embodiments, some shaped solids 150 may only be connected to one of layers 110 and 120.

Because composite material 100 is intended to be used in garments and similar products, it is anticipated that composite material 100 may need to be sized and cut to different shapes, for example, according to patterns. In some applications it may be possible to cut each of layers 110 and 120 of composite material independently to achieve the desired shape of cut material 100. It is, however, anticipated that cutting composite material 100, having a high percentage of solid material, may prove challenging. Therefore, it is anticipated that in some applications desired material shapes may be first cut from the above described sub-assemblies with these sub-assemblies joined together according to the various methods described above. It is also anticipated that in other applications the desired material shapes may be first cut or formed from layers 110 and 120, and subsequently that these layers having the desired plan form will then be converted to sub-assemblies by connecting respective shaped solids 130 and 140 to layers 110 and 120, with these sub-assemblies joined together according to the various methods described above. In such embodiments, one or both sub-assemblies may include a perimeter (respectively of layers 110 and 120) without solid shapes 130 and 140 to facilitate the joining of patterned sections by sewing, bonding, ultrasonically welding, and by other means.

While composite material 100 is depicted as substantially planar, such material allows for flexibility such that composite material 100 can conform to the shape of a body part and/or allow for free movement of a body part. In further embodiments, it is anticipated that composite material 100 may be constructed such that it follows the contour of a shape, such a body part (e.g., torso). In such embodiments the composite material 100 may be constructed with suitable variation to its component structures and fabrication methods so that a composite structure having a neutral state of a concave/convex form or mix thereof (i.e., compound curvature) is achieved. Such construction can be achieved through various means including the use of tooling shaped to mimic the desired form and variants of shaped solids 130, 140 and 150 (with, for example, smaller solid shapes on the concave side of composite material 100 and larger solid shapes on the convex side of the composite structure). Alternate means of achieving such a construction may also include pre-stressing or stretching one or both of layers 110 and 120 in one or more directions as composite material 100 is fabricated to induce a compressive load in one or more of layers 110 and 120.

While shaped solids 130, 140, and 150 have been illustrated in this embodiment as hemi-spheres or portions of spheres, it is understood that in other embodiments, variations of the depicted geometries and other geometries of shaped solids may be used, including, for example, truncated spheres, blended spheroid/hexagonal prisms, tapered hexagonal prisms, triangular prisms, tapered triangular prisms, cuboids, tapered cuboids, etc. While the embodiments shown herein depict the structure of the disclosed composite material as having planar opposing surfaces, and solid shapes 130, 140 and 150 dimensioned and arranged so as to form largely planar opposing surfaces, variations of the dimensions and positions of solid shapes 130, 140 and 150 are contemplated that would result in non-planar structures. For example, solid shapes 150 could be dimensioned so as to extend beyond a plane defined formed by one or both of the arranged patterns of solid shapes 130 and 140. Alternatively, solid shapes 150 may be dimensioned so as to lie within or below a plane defined by one or both of the arranged layers of solid shapes 130 and 140. Such non-limiting examples, may result in composite material 100 having one or more non-planar or dimpled exterior surfaces. Further, while not illustrated in this embodiment, it is understood that this and other embodiments may include one or more layers of fabric or sheet material that hold shaped solids 130 and 140 in contact respectively with first and second outer layers 110 and 120. Such fabric or sheet material may be attached to shaped solids 130 and 140 and to first and second outer layers 110 and 120 by various methods including, for example, flame lamination, adhesive, co-molding, ultrasonic welding, etc. These additional fabric or sheet material layers may have properties and attributes like those of outer layers 110 and 120, as described above, including for example fiber reinforcement. Embodiments including these additional fabric or sheet material layers may be assembled in similar fashion to the methods of fabrication described herein, with the necessary variations and modifications of connecting these additional fabric or sheet material layers to layers 110 and 120 and/or connection of solid shapes 150 to these intermediate layers. In addition, while not illustrated in this embodiment, the composite material 100 may include or be used with additional layers of fiber/filament material (e.g., aramid or UHMW-PE layers) positioned proximate to a protected body part. Such additional layers may further absorb and distribute impact energy, prevent projectile or stab penetration, and prevent penetration of spall and or fragmented parts of shaped solids.

Figure 6:
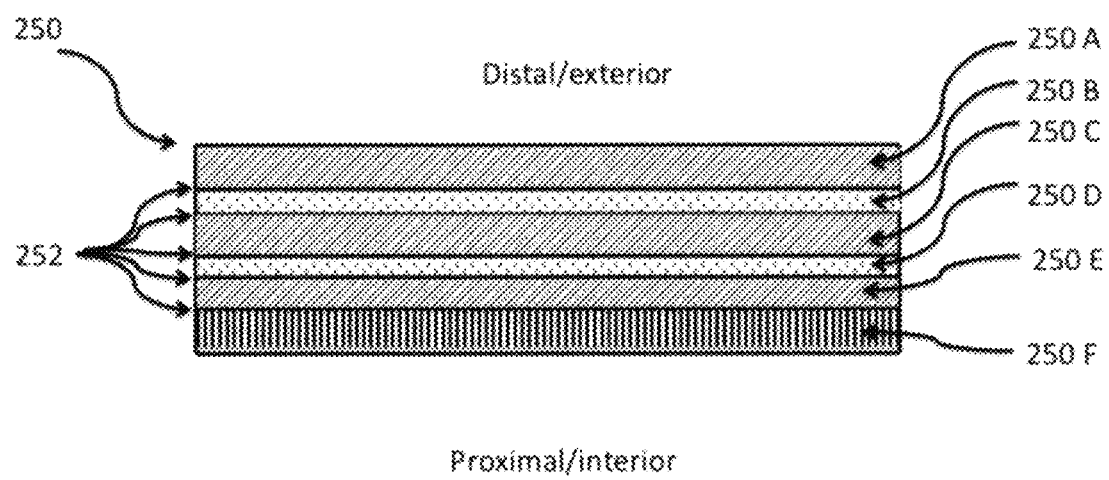
FIG. 6 is a schematic view of a composite solid.

FIG. 6 schematically illustrates a composite solid 200, the structure of which is applicable to any of the solids discussed herein. Shaped solid 200 is a composite structure and may have two (2) or more material layers (200-X, e.g., 200A and 200 B) of relatively high hardness material joined together and/or separated by a layer of material 202 having high fracture toughness. The material layers of relatively high hardness material may be any of the materials previously described depending on the intended application for composite material 100 incorporating a shaped solid. Layers 200A-F, in the exemplary illustration of FIG. 6, may each be made of the same material, or may also be of different materials. For example, in embodiments used for body armor, one or more layers of relatively high hardness material may have a higher hardness, and potentially lower fracture toughness (e.g., 200A, 200 C, and 200 E), and the other layer(s) of relatively high hardness materials may have a lower hardness but better fracture toughness (e.g., 200 B, D and F). For example, in embodiments where first layer 250A is distal from a protected body portion layer 200A may be selected for its higher hardness, and other layer(s) (e.g., 200F) may be selected for greater fracture toughness, although such layer may nonetheless have a relatively high hardness (for example, when compared to a layer 202 selected for high fracture toughness). Such embodiments may be advantageous in situations where the relatively high hardness of layer 200 A is desired to cause a projectile to fracture upon impact and the greater fracture toughness of layer 200B is desired to retain its structure to redirect residual applied impact forces in a direction normal to the applied load direction and/or to distribute impact forces over a greater surface area as those forces are borne by layers 200C-250F. By way of example, layers 200A, 200C and 200E may be comprised of a ceramic material (all the same ceramic (e.g., $Al_2O_3$) or two or more different ceramic materials (e.g., $Al_2O_3$ and yittria stabilizied $ZrO_2$), layers 200 B and D may be a ceramic or metal (e.g., titanium alloy) and layer 200F may be a metal or polymer layer. The relative material properties, number of layers, relative thickness of layers of materials used in a shaped solid 200 depend on the specific application.

Layer 202 may be any suitable material as described above selected for having relatively high fracture toughness, so that it may reduce the likelihood that fractures initiated in any of layers 200A-F do not propagate to additional layers. Layer(s) 202 may serve to join two of layers 200A-F to one another and may be, for example, a urethane, silicone, epoxy, adhesive, ionomer (e.g., Surlyn®), rubber layer or a solder/braze compound. In embodiments of shaped solid 200, layers 202 may be the same materials or may be different materials depending, for example, on the layers 200-X to be joined. In further embodiments, layer 202 may be part of a structure co-molded or overmolded over shaped solid 200. In such embodiments the material of layer 202 may extend partially or entirely over the side surfaces and opposing (non-facing) surfaces of the shaped solid 200. In such embodiments, co-molding and/or overmolding of layer 202 may serve to join layers 200-X. In other embodiments the shaped solid 200 may be constructed of the desired layer(s) 200-X and layer(s) 202 and co-molded/overmolded with a desired material. In yet further embodiments, shaped solid 200 may include a layer of material on the opposing (non-facing) surfaces of layers 200A and 200F to facilitate attachment to a layer of material on a proximal or distal surface of an embodiment of composite material. Such layer of material may be selected on its ability to bond or be ultrasonically joined and/or physical properties (e.g., fracture toughness).

Further, in additional embodiments, shaped solids may be of the same material having relatively high hardness. Alternatively, shaped solids may be of different materials of relatively high hardness with some shaped solids having lower hardness and increased fracture toughness than others. For example, in some embodiments shaped solids distal from a protected body shaped may have a higher relative hardness (including an aggregate hardness if made of multiple materials/layers) than shaped solids which are proximate to a protected body and may have a higher fracture toughness (including an aggregate fracture toughness if made of multiple materials/layers).

Figure 7A:
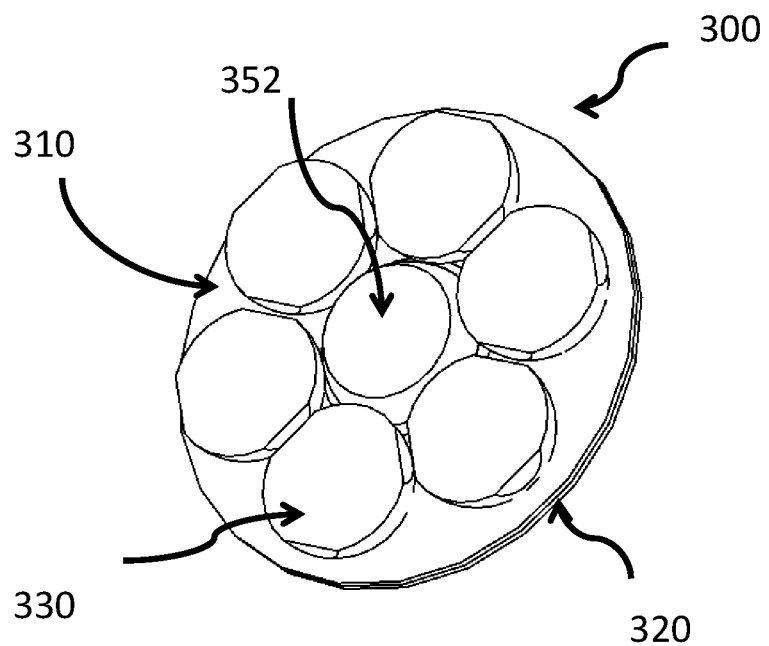
FIGS. 7A and 7B are views of an additional embodiment.
Figure 7B:
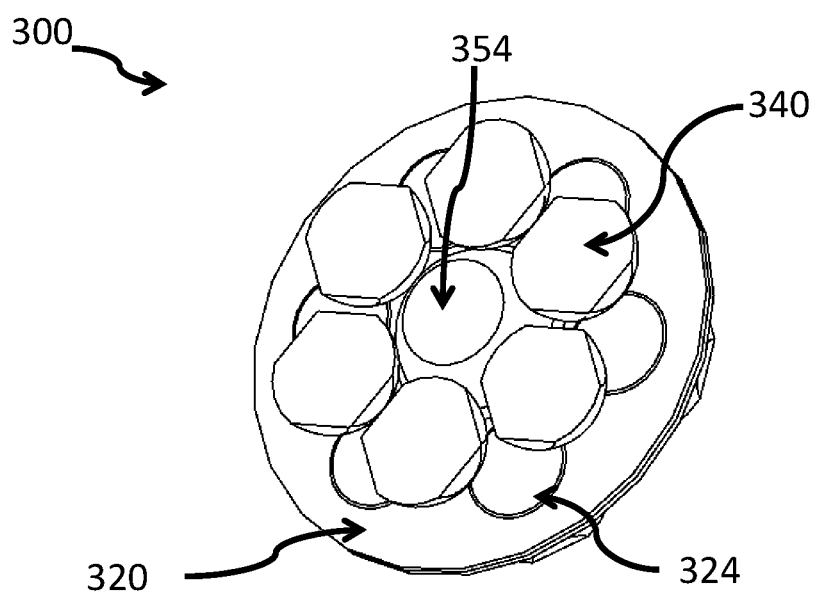

FIGS. 7A and 7B illustrate embodiment 300 of a composite material having intermediate layers 310 and 320 (near or at the mid-plane of composite material 300) that can flex or deform out of plane to accommodate movement of the body or surface protected by the composite material 300. Layers 310 and 320 can accommodate movement of the body or surface protected by the composite material 300 movement with less change in length and/or width than a layer located at an outer surface of composite material 300. Layers 310, 320 maybe sheet layer(s) as described herein that in some embodiments may a fabric layer, a layer of resilient material that may be fiber reinforced, including, for example, a urethane or silicone sheet reinforced with glass or aramid fibers or UHMW-PE filaments (with such reinforcing material being continuous or discontinuous), or a layer of fibers and or filaments that in some embodiments may be interwoven or fused to one another (e.g., UHMW-PE filaments or metal filament/wire arranged in layers and fused to one another at one or more locations.

A first plurality of shaped solids 330 may be connected to layer 310 and a second plurality of shaped solids 340 may be connected to layer 320. Like the embodiment of composite material 100 discussed the first and second plurality of shaped solids 330 and 340 are arranged in a similar repeating pattern around a third plurality of shaped solids. While third shaped solid (one of a plurality in the embodiment shown) is identified with numerals 352 and 354 in FIGS. 7A and 7B to indicate that third shaped solid may be of two-piece construction with a first portion 352 that may be connected to layer 310 and second portion 354 that may be connected to layer 320, in other embodiments the third shaped solid may be a unitary structure (including a composite body according to the teachings of embodiment 200) that is attached to one or the other of layers 310 and 320. Each of the first, second and third plurality of solids and/or portions thereof may be connected to layers 310 and 320 according to methods of connected shaped solids to material layers already discussed herein.

In embodiments where layers 310 and 320 are separate layers, one or both layers 310 and 320 may include one or more openings to allow the passage of a fastener or other mechanical attachment of a shaped solid to the layer. In some embodiments one or both of layers 310 and 320 may include an opening to allow a portion of a shaped solid to partially pass through a layer. Alternatively, or in addition, and one or both of layers 310 and 320 may include a contoured relief (as indicated by numeral 324) to accommodate a portion of a shaped solid without needing an opening in a layer. In some embodiments, one or both of layers 310 and 320 may include inserts molded into or molded over by a layer 310/320 having one or more features (e.g., threading, barbed fitting, protrusions, openings, snap fitting, etc.) that serve to locate and/or attach a shaped solid to a layer having such insert.

In some embodiments, the first and second portions 352 and 354 of the third plurality of solid shapes may be molded to and/or embedded in the material comprising one or both of layers 310 and 320. In some embodiments, each of first and second portions 352 and 354 of the third plurality of solids and/or their respective layers 310 and 320 may include locating and/or attachment features on surfaces of first and second portions 352 and 354 that face one another when layers 310 and 320 are placed together. Such locating and/or attachment features can secure layers 310 and 320 to one another. In some embodiments, the locating and/or attachment features may maintain layers 310 and 320 in close proximity to one another, but allow some relative movement between those layers (e.g., sliding of each layer with respect to the other). In embodiments having first and second portions 352 and 354 of the third plurality of solids molded to and/or embedded in the material comprising respective layers 310 and 320, the first and second plurality of solid shapes 330 and 340 may be attached to their respective layers prior to positioning of in close proximity and/or attachment of layers 310 and 320.

Figure 8:
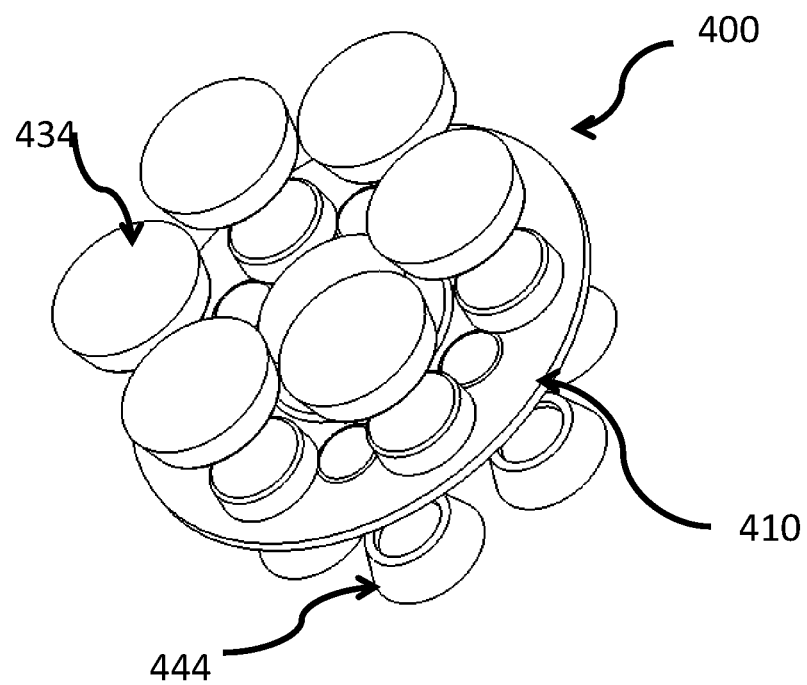
FIGS. 8A-8C are views of an additional embodiment.
Figure 8:
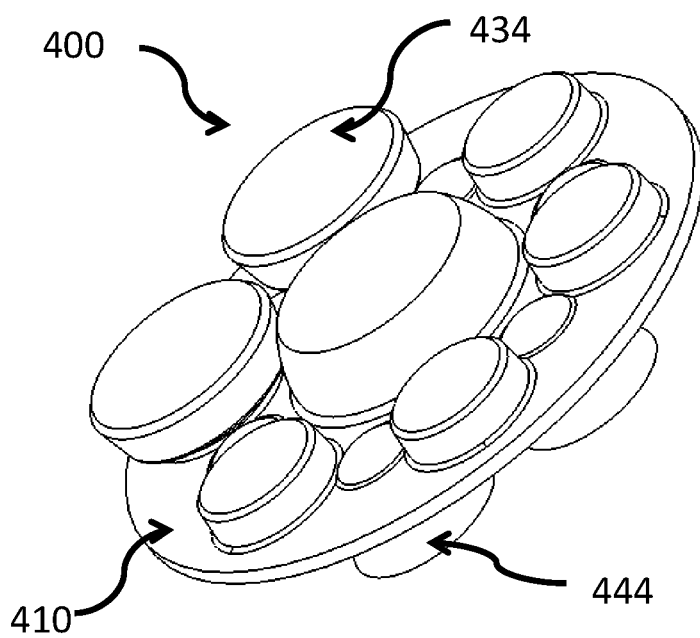
Figure 8C:
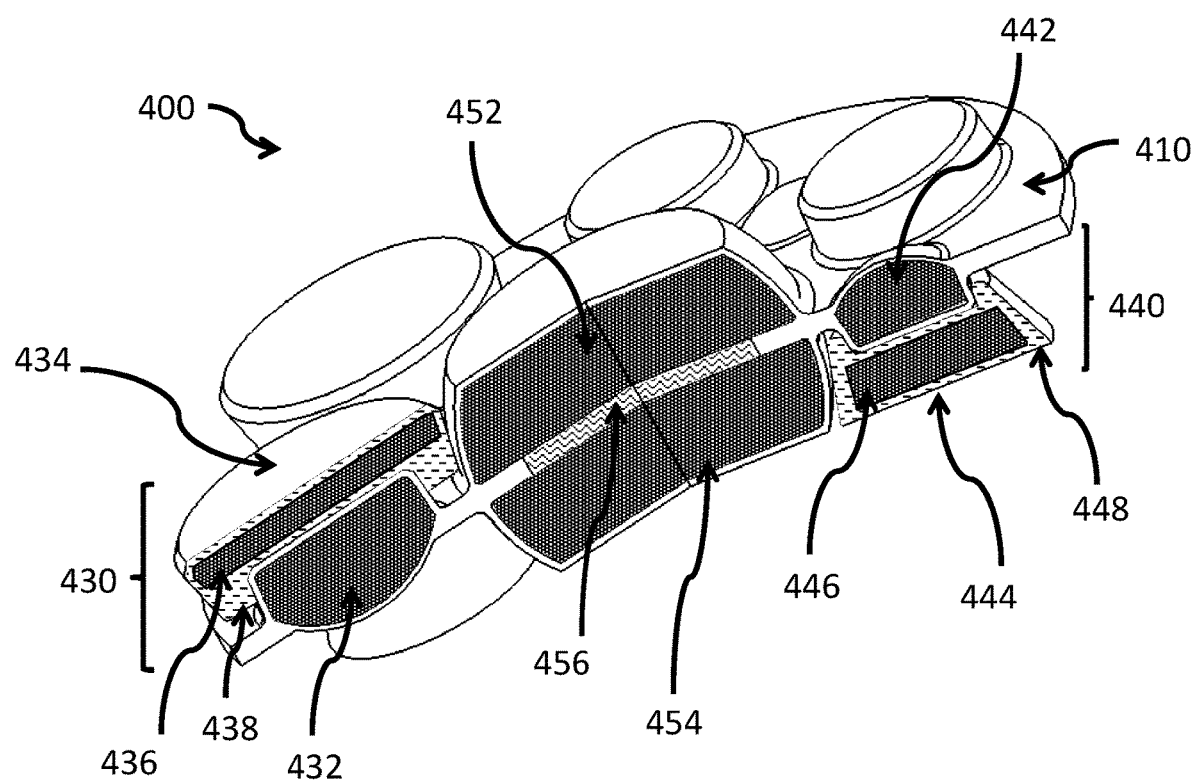

FIGS. 8A-C illustrate embodiment 400 of a composite material having an intermediate layer 410 that can flex or deform out of plane to accommodate movement of the body or surface protected by the composite material 400 and having a plurality of solids molded (partially or fully) or embedded therein. With reference to FIG. 8C, the plurality of solids molded (partially or fully) or embedded in layer 410 may include a plurality of first portions 432 of first shaped solids 430, a plurality of first portions 442 of second shaped solids 440, and a plurality of first 452, second 454, third 456 portions of third shaped solids 450. As is also shown in FIG. 8C, embodiment 400 may include a plurality of second portions 434 of second shaped solids 430 and a plurality of second portions 444 of second shaped solids 440 joined to layer 410 proximate to the respective first portions 432 and 442 of the first and second shaped solids in layer 410. As further shown in FIG. 8C, second portions 434 and 444 of first and second shaped solids 430 and 440 respectively may comprise solids 436 and 446 co-molded/over-molded/molded into shells 438 and 448. In embodiments of composite material 400, solids 432, 436, 442, 448, 452, 454 and 456 may be of the same or different materials, selected according to the principals discussed herein and for the desired application of composite material 400. For example, the aforementioned solids, could be ceramic materials selected for relatively high hardness values and ability to deform and absorb energy upon impact from projectiles striking composite material 400. In other embodiments, solids distal from a protected body or surface may be selected for such criteria, while solids proximal to the protected body/surface may have relatively high hardness values, but also selected to have greater fracture toughness than the distally located solids. By way of example, solid 452 may be a high hardness ceramic (e.g., boron carbide), solid 454 may be a metal layer (e.g., titanium alloy) and solid 456 may be a ceramic or metal selected for fracture toughness (e.g., yttria stabilized zirconia or a titanium alloy) or alternatively a fiber reinforced polymer. Each of solids 432, 436, 442, 448, 452, 454 and 456 may also be composites structures themselves according to the principles discussed herein, including with respect to solid 200.

FIG. 8A illustrates an exploded view of embodiment 400, in which it can be seen that layer 410 may comprise a plurality of solids 432, 442, 452, 454 and 456 positioned and held in a material layer that allows for out of plane flexibility (i.e., materials discussed herein as suitable for such a material layer). Second portions 434 and 444 of first and second shaped solids 430 and 440 may be separately fabricated and attached proximate to their respective first portions 432 and 442 in layer 410 (see e.g., FIG. 8B showing two each of second portions 434 and 444 of first and second shaped solids 430 and 440 attached to layer 410). Attachment may be done according to suitable methods discussed in herein, including, for example, adhesive attachment and ultrasonic welding. In embodiments where the material of layer 410 is selected for certain properties (e.g., planar flexibility) and the shells 438 and 448 of second portions 434 and 444 may be selected for other properties (e.g., fracture toughness/abrasion resistance, etc.) ultrasonic welding may be used to join such materials. By way of example, layer 410 may be a material layer like those discussed herein, including, for example, a urethane, silicone or rubber layer (with or without fiber reinforcement) having a relatively low durometer (e.g., Shore A 40-70), while shell layers 438 and 448 may be an ionomer (e.g., Surlyn®) having a relatively high durometer Shore D 60+, which may be joined through ultrasonic welding. Embodiments of composite material 400 so constructed may result in a composite layer construction with one or more layers of relatively high hardness material separated by one or more layers of relatively high fracture toughness material, providing similar structure and performance to the structure of solid 200 discussed above. It is noted that while portions 452, 454 and 456 are illustrated as embedded/molded (wholly or partially in) layer 410, in other embodiments, the third shaped solid 450 may be constructed like first and second shaped solids 430 and 440.

It should be noted, as with all embodiments discussed herein, that the size and shape of the shaped solids illustrated in embodiment 400 are representative only. Embodiments incorporating the teachings of embodiment 400, may include geometries of solids embedded/molded (wholly or partially in) layer 410 and/or of the portion of layer so over-molded having alignment and/or locating features to facilitate the attachment of second portions of solids, like second portions 434 and 444. In addition, such embodiments may include features on the mating surfaces of layer 410, the embedded/molded (wholly or partially in) solids, the second portions of solids, etc. to facilitate their respective connection, including by molding and/or ultrasonic welding.

Embodiments of composite material 400 allowing for the fabrication of a layer 410 with solids embedded/molded (wholly or partially) therein and attachment of a plurality of second portions of solids, like second portions 434 and 444, permit the fabrication of garments where portions of layer 410 may be sized, cut and assembled for a particular body or body shape and pluralities of second portions of solids may be selected and joined to layer 410 based on size, geometry and composition for specific locations on the garment. For example, in an embodiment with second plurality of shaped solids 430 on an exterior or distal side of a body to be protected, different sizes or different shapes of shaped solids 430 may be chosen to accommodate different amounts of desired flexibility (concavity) of composite material (with smaller shaped solids generally allowing for tighter radii of concavity/more flexibility) and/or to better conform to the shape of a protected body. Larger shaped solids 430 may be selected to provide greater protection in certain regions of the protected body, but may limit concave flexibility, which may be acceptable in that region and/or may follow a portion of the body that is generally convex in a neutral position and/or throughout normal range of motion. By way of further example, different materials can be selected for shaped solids 430 based on location relative to a body to be protected and the properties of the shaped solid. Although discussed with respect to shaped solid 430, it is understood that the same considerations may be applied to any of the solids discussed with respect to embodiment 400 or its teachings as applied to other embodiments. Applying these principles, embodiments of composite material 400 allow for a highly customizable garment both in tailored sizing, fit, mobility and impact resistance performance.

Figure 9:
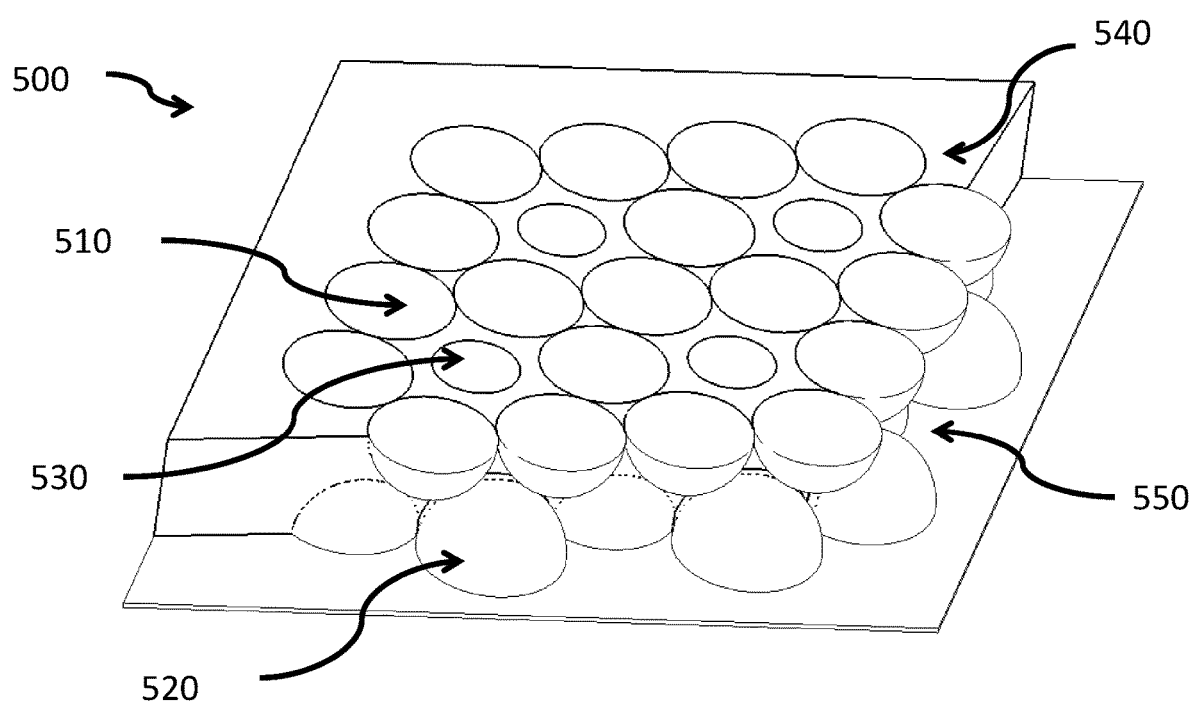
FIG. 9 is a view of an additional embodiment.

FIG. 9 illustrates an embodiment 500, that like the previously described embodiments, includes a first, second and third plurality of solid shapes (510, 520, 530) arranged such that forces applied to a surface of embodiment 500 are redirected and distributed into and by the material in a similar fashion as already discussed. Shaped solids 510, 520 and 530 may also be composite structures themselves. In embodiment 500 the first, second and third plurality of solid shapes (510, 520, 530) may be maintained in their relative positions with respect to the other solid shapes (including of the same type) by one or more materials 540 in the spaces around the first, second and third plurality of solid shapes, including, for example, in the interstices between the solid shapes. Such material may bond to surfaces of the various solid shapes and/or may encapsulate the solid shapes. In some embodiments, one or more surfaces of the plurality of shaped solids 510, 520, 530 may be prepared/coated/treated to promote adhesion to material 540. In other embodiments, one or more surfaces of the plurality of shaped solids 510, 520, 530 may be alternately prepared/coated/treated to resist adhesion to material 540. Suitable materials 540 may include foam materials (e.g., urethane foams), injection molded or cast materials (rubbers, silicones, urethanes, etc.) that allow for out of plane flexibility of the composite material. Other suitable materials may include bio-fabricated materials, such as mycelium (e.g., MycoFlex™ by Ecovative Design) or collagen protein based materials (e.g., Zoa™ by Modern Meadow). Such materials may provide desirable material characteristics for certain applications, including: fire resistance, cut resistance, water absorption resistance, breathability, flexibility, as a spall layer, and strength for certain applications. As shown, embodiment 500 may include one or more optional surface layers (e.g., layer 550), which may be selected for cosmetic and/or on the basis of desired material properties (e.g., urethane, nylon/Spectra material or blends thereof for abrasion/cut resistance, water repellency and/or fire resistance). Optional surface layers, like layer 550, may be attached (according to methods described herein) to one or more of the plurality of shaped solids 510, 520, 530 and/or to material 540. In other embodiments, one or more of surface layers, like a layer 550, may not be attached to any of one or more of the plurality of shaped solids 510, 520, 530 and/or to material 540.

FIGS. 10-15 illustrate embodiment 600 having first, second and third pluralities of shaped solids 630, 640 and 650 with angled or tapered surfaces, such that when the shaped solids 630, 640 and 650 are arranged in repeating patterns according to the principles discussed herein, the angled or tapered surfaces allow for relative movement between each shaped solid 630, 640 and 650 and flexibility of composite material 600, while providing impact protection and at least one layer comprising a solid layer to resist penetration of composite material 600. In embodiments of composite material 600 as it is moved out of plane, angular spaces between shaped solids of the material may open or close (depending on the movement of material 600 and location of the shaped solid). In general, enlargement of an angular space between solids near one external surface of material 600 will result in the contraction of one or more angular spaces between solids near an opposing external surface of material 600. In other words, as some solid shapes may move apart from one another to allow for movement of material 600 out of plane in one direction, other shaped solids on an may move closer together, with the net effect of maintaining impact and penetration resistance of material 600 throughout ranges of motion and positions.

Figure 10A:
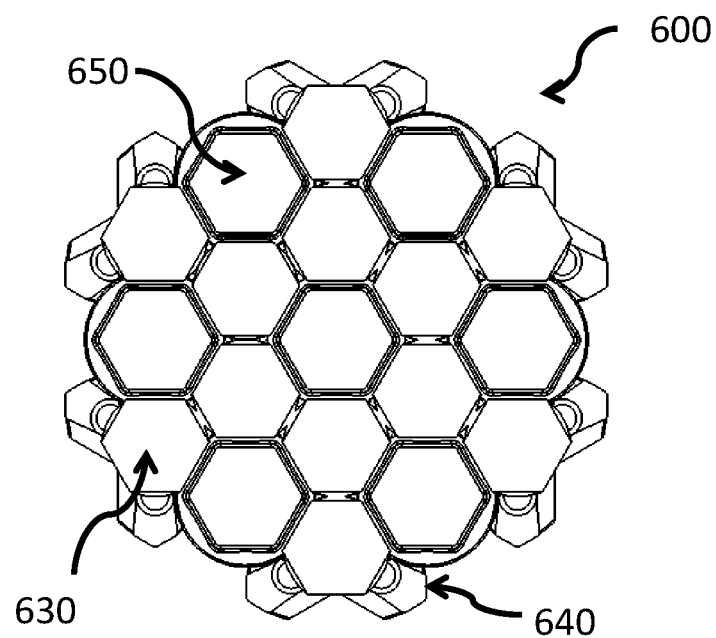
Figure 11A:
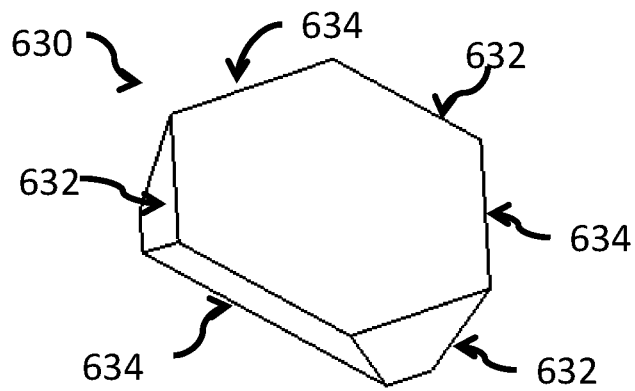
Figure 12A:
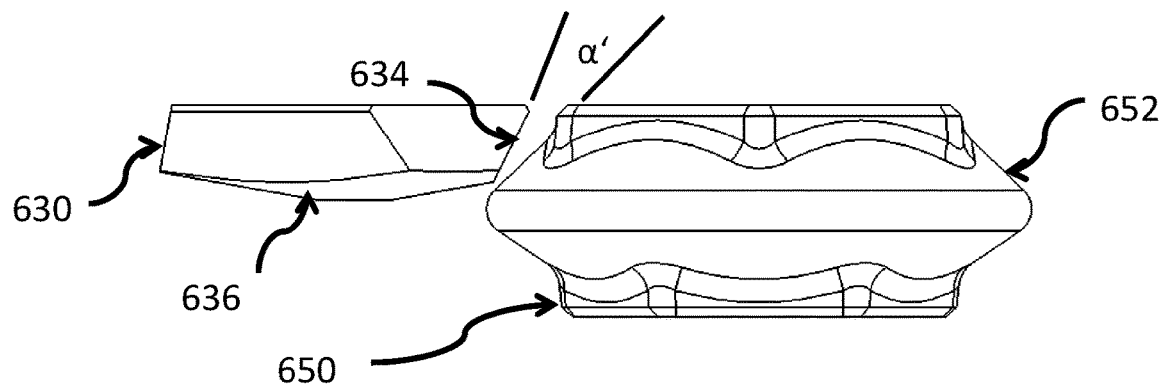
Figure 12B:
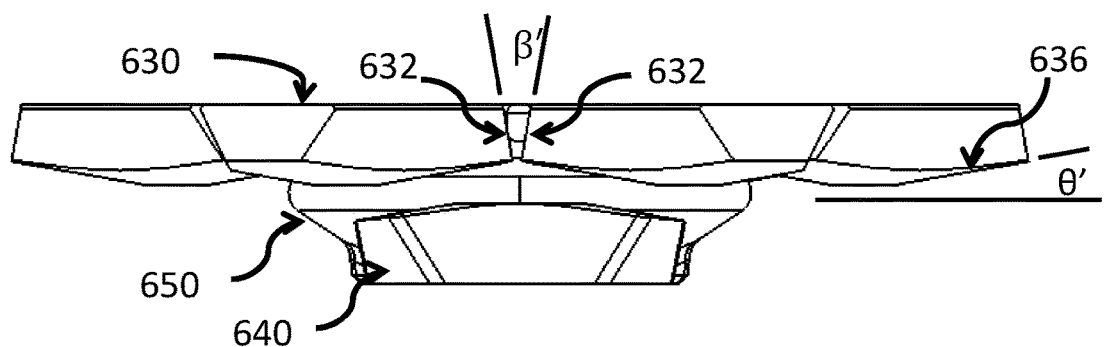

Like embodiment 100, embodiment 600 includes first and second shaped solids or portions thereof having greatest cross-sectional areas proximate external surfaces of the composite material. As shown in FIG. 11A, shaped solid 630 has a generally hexagonal prismatic shape with three each of angled or tapered surfaces 632 and 634. Each surface 632 of a shaped solid 630 faces another surface 632 of an adjacent shaped solid 630 when arranged according to the embodiment 600 as shown in FIG. 10A. Each surface 634 of a shaped solid 630 faces a surface 652 of a shaped solid 650, when arranged as shown in FIG. 10A. As illustrated in FIG. 12A, angle $\alpha'$ between surfaces 634 and 652 and the spacing between such surfaces allows for angular displacement of shaped solids 630 and 650 with respect to one another. Similarly, as illustrated in FIG. 12B, angle $\beta'$ between surfaces 632 of two adjacent shaped solids 630 allows for angular displacement of those shaped solids 630 with respect to one another. As is also illustrated in FIG. 12B, shaped solid 630 may include a tapered/angular surface 636 having an angle $\theta'$ with respect to a plane of composite material 600. In embodiments of composite material 600 having an intermediate layer, tapered/angular surface 636 allows angular displacement with respect to such intermediate layer. In addition or alternatively, surface 636 may allow angular movement of shaped solid 630 with respect other shaped solids, like shaped solids 640, arranged in composite material 600. In some embodiments, angles $\alpha'$, $\beta'$, $\theta'$ may be substantially equal or may be of different values depending on desired relative movement between the respective surfaces separated by such angles.

Figure 10B:
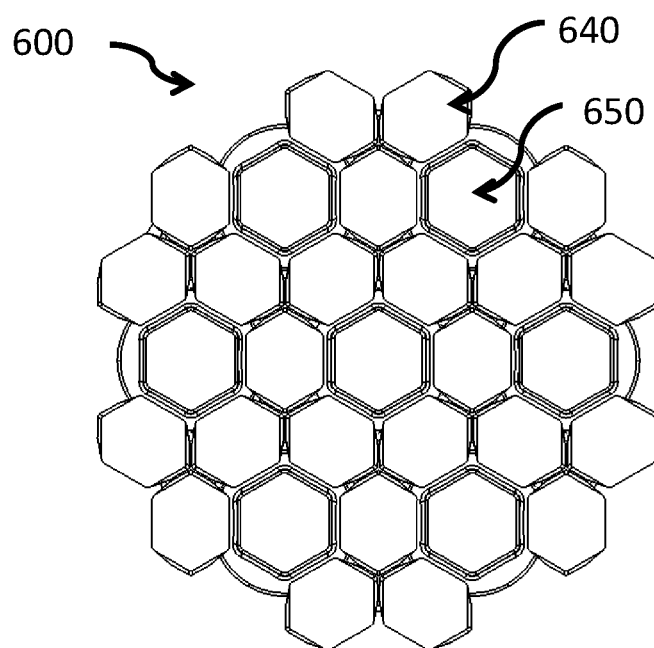
Figure 11B:
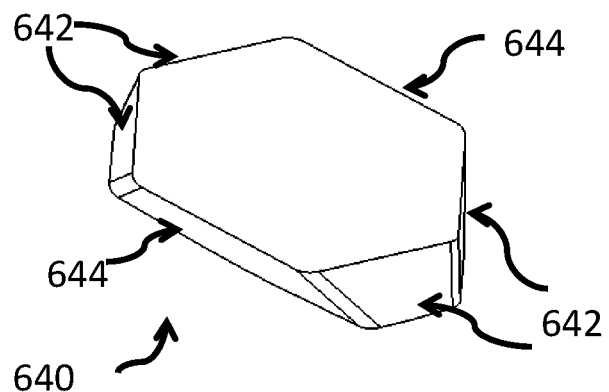

As shown in FIGS. 11B, 13A and 13B, shaped solid 640, like shaped solid 630 has a generally hexagonal prismatic shape, however, shaped solid 640 has four angled or tapered surfaces 642 and two angled or tapered surfaces 644. Each surface 642 of a shaped solid 640 faces another surface 642 of an adjacent shaped solid 640 when arranged according to the embodiment 600 as shown in FIG. 10B. Each surface 644 of a shaped solid 640 faces a surface 654 of a shaped solid 650, when arranged as shown in FIG. 10B. Like shaped solid 630 discussed above, the surfaces 642, 644 and 646 of shaped solid 640 may be form angles $\alpha''$, $\beta''$ and $\theta''$ with respect to surfaces of other shaped solids and/or planes of composite material to allow angular displacement of shaped solid 640 as composite material 600 moves or conforms out of plane. In some embodiments, angles $\alpha''$, $\beta''$, $\theta''$ may be substantially equal or may be of different values depending on desired relative movement between the respective surfaces separated by such angles. Likewise, each of a', B', and $\theta'$ may be substantially equal to $\alpha''$, $\beta''$, and $\theta''$, or those angles may differ, particularly if it is desired that an embodiment have greater flexibility (including ability to form a concave curvature having a smaller radius) as composite material is moved out of plane in one direction than in another direction. Suitable values for included angles $\alpha'$, $\beta'$, $\theta'$ $\alpha''$, $\beta''$, and $\theta''$ may be 0 (for no relative movement between surfaces) and values up to and including 45 degrees. In certain embodiments where impact/penetration resistance may be a primary concern, values for included angles α', β', θ' α", β", and θ" may be 0 and/or between 0 and 20 degrees.

In some embodiments, each like surface of each of shaped solids 630, 640, and 650 represented by and forming angles α', β', θ', α", β", θ" may have the same or different angular values. For example, each of surfaces 632 of a shaped solid 630 may form the same or different angles α' with their respective adjacent surfaces 632 of a neighboring shaped solids 630. In embodiments where surfaces 632 of a shaped solid 630 may form different angles α' with their respective adjacent surfaces 632 of neighboring shaped solids 630, composite material 600 may allow for different out of plane flexibility (greater or less flexibility) in one direction (e.g., in its width) when compared to another direction (e.g., in its length). According to such embodiments as applied, for example, to a material protecting a torso, this may allow for different flexibility of material 600 as it is applied around a circumference of the torso when compared to its flexibility (including, for example, range of motion out of plane/radius of curvature) along the length of the torso to be protected. These principles, like those discussed with respect to embodiment 400, and which may be used together with features of embodiment 400, allow for a highly customizable garment both in tailored sizing, fit, mobility and impact resistance performance.

Figure 11C:
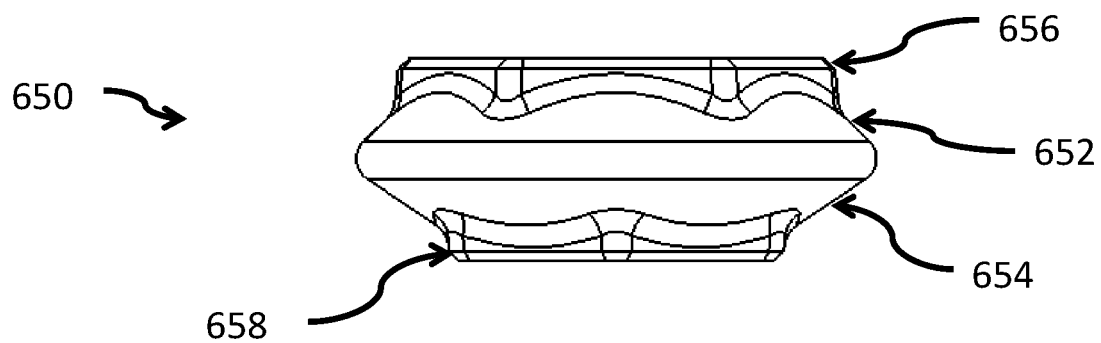

As mentioned, shaped solid 650 includes surfaces 652 and 654, both of which are depicted in FIG. 11C as tapered/conical surfaces. In other embodiments, surfaces 652 and 654 may other configurations, and may be tapered, conical, angular, planar, partially spherical, or rounded. Likewise, the surfaces of shaped solids 630 and 640 discussed herein may be tapered, conical, angular, planar, partially spherical, or rounded. Shaped solid 650 further includes protrusions 656 and 658, each extending respectively from surfaces 652 and 654. As shown in FIGS. 10A and 10B, protrusions 656 and 658 have a generally hexagonal shape, with each edge thereof generally proximate and parallel to edges of shaped solids 630 and 640 arranged around shaped solids 650. In other embodiments, protrusions 656 and 658 may have different forms and/or one or more may not be included in shaped solid 650. In some embodiments, the form of protrusions 656 and 658 may be selected to maximize solid volume of composite material 600, while still allowing desired flexibility/mobility of a protected body or surface.

Figure 15:
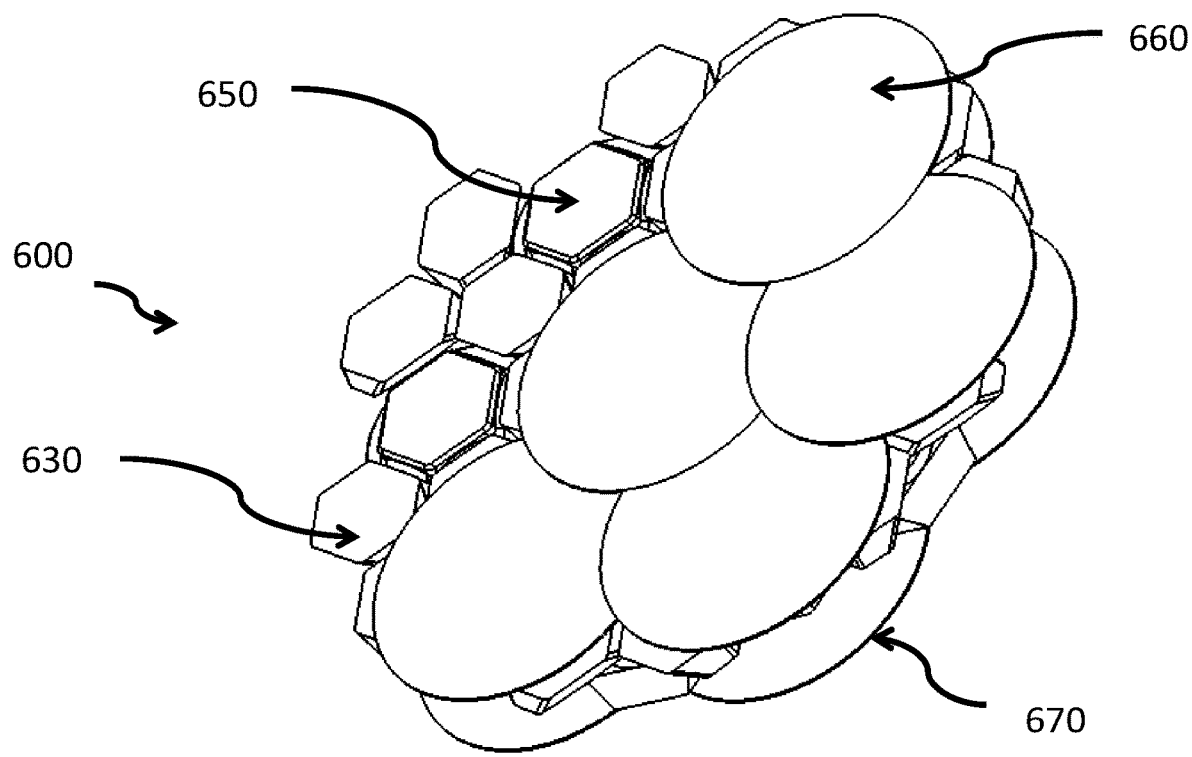

FIG. 15 illustrates an embodiment 600 having a first and second pluralities of material layers 660 and 670 attached to the plurality of third shaped solids 650. Material layers 660 and 670 can be fabric layers, layers of resilient material that may be fiber reinforced, including, for example, a urethane or silicone sheet reinforced with glass or aramid fibers or UHMW-PE filaments (with such reinforcing material being continuous or discontinuous), or a layers of fibers and or filaments that in some embodiments may be interwoven or fused to one another (e.g., UHMW-PE filaments or metal filament/wire arranged in layers and fused to one another at one or more locations. The plurality of material layers 660 and 670 need not all have the same material construction or geometry. While illustrated as circular, material layers 660 and/or 670 may, for example, be hexagonal and/or tapered and/or have rounded corners and edges. As illustrated material layers 660 and 670 are each interleaved with adjacent material layers, such that each material layer 660 and 670, respectively, overlays or is overlaid by another of the plurality of material layers 660 and 670. Accordingly, each of the plurality of material layers 660 and 670 form an interleaved layer that can conform to the curvature (concave/convex and compound curvatures) of a protected surface or body, and remain interleaved as throughout a range of motion of the composite material. An interleaved layer formed by the plurality of material layers 660 and 670 can provide protection to a protected surface or body from impact, from portions of first, second, or third shaped solids that may be fractured upon impact and may further distribute applied loads to the protected surface or body that are transmitted through material 600, and/or can provide additional penetration resistance at locations between any of the plurality of shaped solids in a composite material without limiting the movement of those shaped solids in the composite materials. The interleaved material layers 660 and 670 are shown connected to third shaped solids 650 (and may be connected by mechanical or adhesive means), but in alternate embodiments may be connected to one or more of the plurality of first and second solid shapes (630, 640) in addition or instead. In addition, while shown connected to opposing external surfaces of third solid shape 650, in other embodiments only one material layer 660 or 670 may be included in an embodiment.

Figure 14:
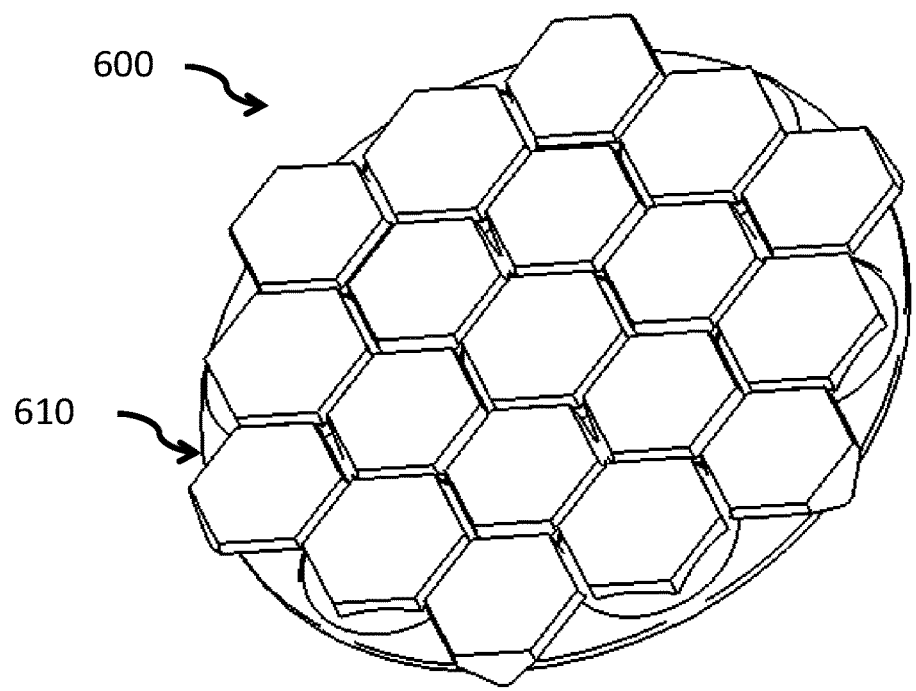

As with the various embodiments discussed herein, the various features, attributes and variants discussed with respect embodiment 600 may be included as part of other embodiments discussed herein and vice-versa. For example, as shown in FIG. 14, embodiment 600 may include an intermediate layer 610 (or multiple intermediate layers) to which one or more of the plurality of shaped solids 630, 640 and 650 may be connected to. By way of further example, one or more of the plurality of shaped solids 630, 640 and 650 may be composite structures like those discussed with respect to solid 200 or embodiments 300 and 400, including for example having portions molded/embedded in one or more intermediate layer. Embodiments of material 600 may also include teaching from embodiment 500 and have material(s) like that described with respect to embodiment 500 located in interstices between shaped solids and or attached to the surfaces of such solids.

FIGS. 16-19 illustrate an embodiment 700 having a plurality of shaped solids, in 710 arranged in two layers, in offset repeating patterns, such that a first surface 712 of each shaped solid 710 faces the first surfaces 712 of three shaped solids 710 arranged opposite therefrom. Shaped solids 710 also include a second surface 714 opposite to first surface 712 and proximate to the exterior surfaces of material 700, and a plurality of third surfaces 716 arranged between surfaces 712 and 714. Surface 712 is illustrated as a tapered or conical surface, although in other embodiments it may be tapered, conical, angular, planar, partially spherical, or rounded to allow movement of each solid shape 710 to move with respect to the neighboring solid shapes 710 in an opposing layer. Surface 716 may be an angled surface such that when positioned adjacent to a surface 716 of a neighboring solid shape 710 located in the same layer, each solid shape 710 may move (including displace angularly) with respect to one another. In some embodiments, each surface 716 may be generally perpendicular to a plane tangent to surface 712. Similar considerations and characteristics regarding angular/tapered surfaces discussed with respect to embodiment 600 apply to embodiment 700. Like embodiment 100, embodiment 700 includes first and second shaped solids (each 710) or portions thereof having greatest cross-sectional areas proximate external surfaces of the composite material. In embodiment 700, the greatest cross-sectional area of first and second shaped solids are located at positions in the thickness of material 700 between the respective external surfaces of first and solid shapes 710 and a midplane of material 700.

Figure 16:
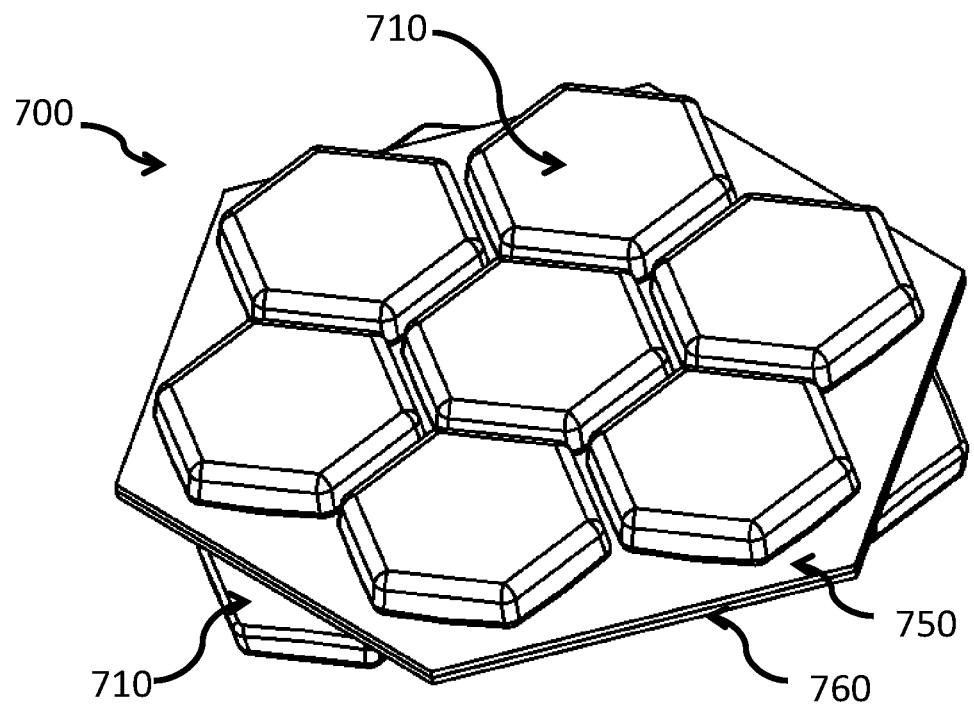
Figure 17:
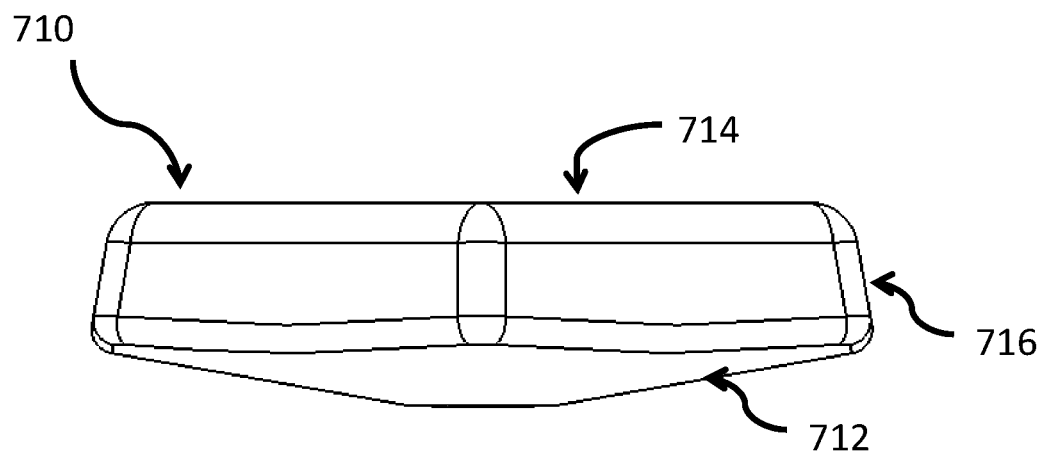
Figure 18:
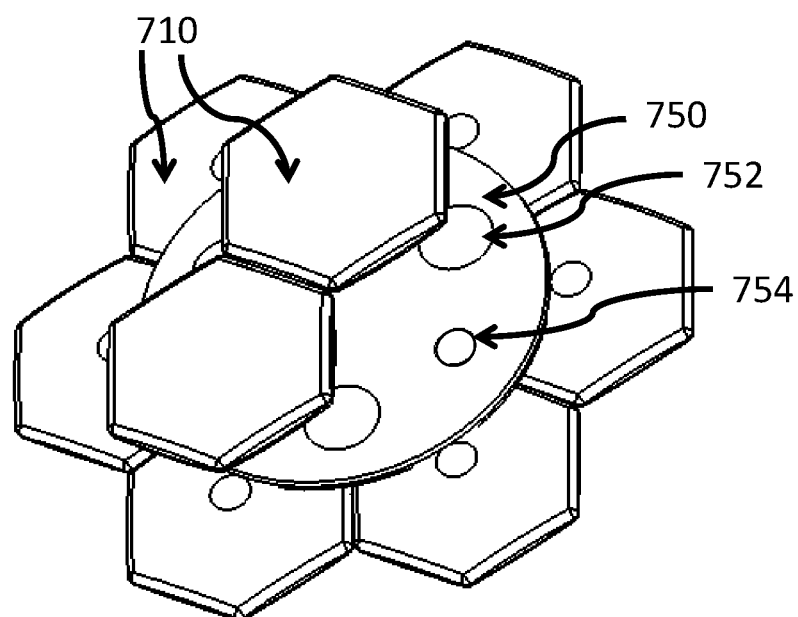

As shown in FIG. 16, shaped solids 710 may be connected to one or more intermediate layers (e.g., layers 750 and 760), like embodiment 300 discussed above and involving similar considerations and features. As shown in FIGS. 16, 18 and 19, shaped solids 710 are generally hexagonal, and when arranged according to the principles described and depicted herein are arranged in two layers having offset repeating patterns. As a result of this pattern, the center of each shaped solid 710 is generally positioned proximate to a region at which three shaped solids 710 located in the opposing layer meet (i.e., above or below in the thickness of composite material 700 where corners of three shaped solids 710 in an opposing layer meet). At such locations, the thickness of shaped solid 710 centered at such region provides impact and penetration resistance. As is also a result of the described and depicted pattern of shaped solids 710, every other region where the corners of three shaped solids 710 in a first layer meet coincides with a region where three shaped solids 710 located in an opposing layer also meet. At such locations, and without additional solid structure shaped solids 710 may not provide sufficient impact or penetration resistance at those locations in material 700. Accordingly, an additional solid 752 may be positioned at such locations in composite material 700, sized and shaped (e.g., tapered solid disc or hexagonal prism) to fit in the interstices created by shaped solids 710 of opposing layers. FIG. 18 illustrates an embodiment 700 in which shaped solids may be connected to a layer 750 and/or other layers, and in which a solid 752 is attached to (including, for example, molded in (partially or wholly) or embedded in) layer 750 and located to provide impact/penetration resistance at a location where the corners of three shaped solids 710 in each of opposing layers coincide. As also shown in FIG. 18, layer 750 and/or other layers may include a feature or structure 754 (generically represented) to facilitate attachment, locating and/or joining of shaped solids 710 to layer 750 and/or other layers. Such structure or feature may include an opening, fastener, locating feature, an embedded/molded in or over solid, a first portion of a shaped solid embedded/molded like that discussed with respect to embodiment 400, as well as any other structure or feature discussed herein.

Figure 19A:
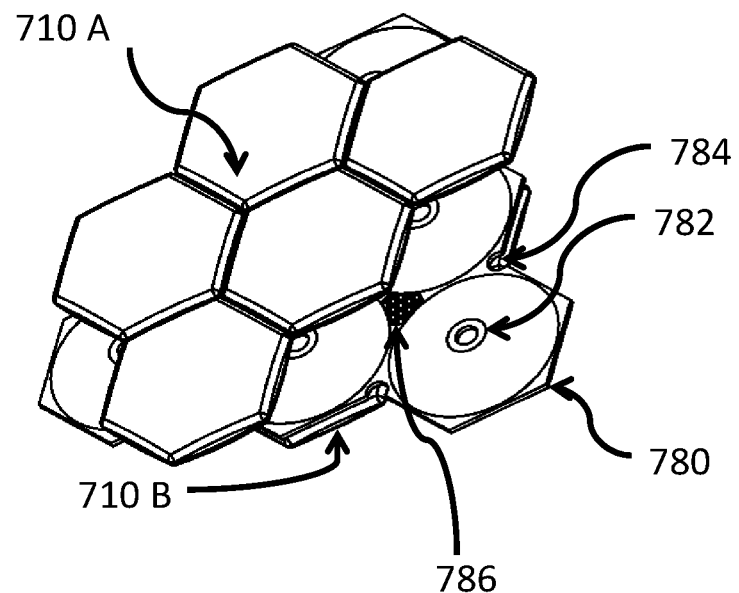
Figure 19B:
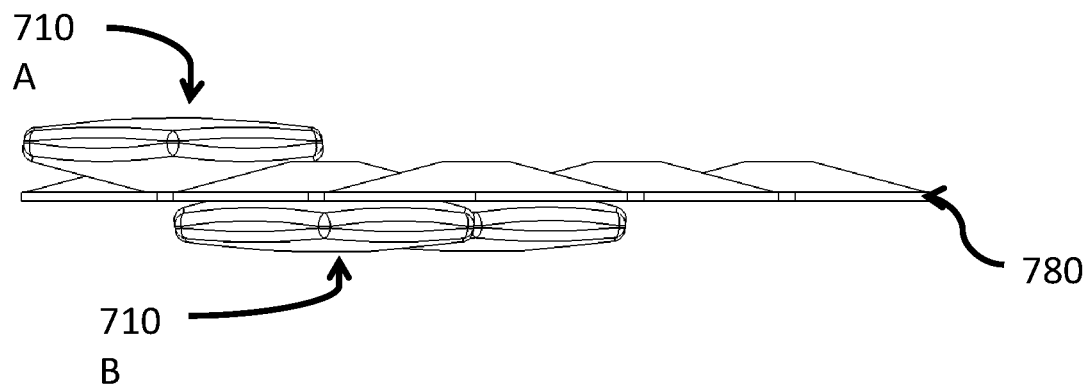

FIGS. 19A and 19B illustrate an embodiment 700 having in intermediate layer 780 having a contoured shape to accommodate the angled surfaces 712 of solid shapes 710 arranged in opposing repeating patterns (identified as 710A and 710B). In this regard, layer 780 includes recesses on one surface that accommodate solid shapes 710A and recesses on an opposing surface that accommodate solid shapes 710B. The recesses of layer 780 may closely follow the respective surfaces 712 of each plurality of shaped solids 710A, 710B and/or may provide spacing between the wall of each recess and surfaces 712 to allow for angular displacement therebetween. Layer 780 may further include features or structures 782 and 784 (generically represented) to facilitate attachment, locating and/or joining of shaped solids 710A and 710 B to layer 780, according to the teachings herein. Layer 780 may also include an embedded or molded in solid, or otherwise reinforced region 786 to provide impact and/or penetration resistance at locations in layer 780 where the corners of three shaped solids 710A and the corners of three shaped solids 710B in opposing layers coincide. Layer 780 may be any suitable material layer like those already described herein, and, for example, may include a molded sheet material (urethane, silicone, rubber, etc.) or a fabric layer, either of which may include fiber reinforcement (continuous and/or discontinuous).

As with the various embodiments discussed herein, the various features, attributes and variants discussed with respect embodiment 700 may be included as part of other variants discussed herein and vice-versa. For example, embodiment 700 may include interleaved layers of material on one or both external surfaces like layers 660 and 670 discussed above. By way of further example, one or more of the plurality of shaped solids 710 and 786 may be composite structures like those discussed with respect to solid 200 or embodiments 300 and 400, including for example having portions molded/embedded in one or more intermediate layer. Embodiments of material 700 may also include teaching from embodiment 500 and have material(s) like that described with respect to embodiment 500 located in interstices between shaped solids and or attached to the surfaces of such solids. Likewise, other embodiments discussed herein, may incorporate features of embodiment 700, including, for example, a contoured intermediary layer. Moreover, while embodiment 700 has been depicted with solid shapes 710 having the same size and shape in opposing repeating layers, it is understood that solid shapes 710 may be different sizes and shapes in each opposing repeating layer (allowing, for example, a neutral state following the contours of a non-planar body) and may also be different sizes shapes within each layer (allowing the same).

FIGS. 20A-20D illustrate embodiment 800, having a plurality of first shaped solids 810, a plurality of second shaped solids 820 and an optional intermediate layer 830. First shaped solids 810 have a generally hexagonal prismatic shape, and first shaped solids 810 are arranged in a repeating pattern according to the principles discussed herein. Second shaped solids 820 have a generally triangular prismatic shape and are arranged in a repeating pattern according to the principles discussed herein. Like embodiment 100, embodiment 800 includes first and second shaped solids or portions thereof having greatest cross-sectional areas proximate external surfaces of the composite material. With specific reference to FIGS. 20 B and 20C, it is noted that the centers of first shaped solids 810 are positioned such that they are generally aligned with regions where three corners of second shaped solids 820 meet. It is further noted, that the centers of second shaped solids 820 are position such that they are generally aligned with regions where three corners of first shaped solids 810 meet. In such embodiments, the thickest portion of each of first and shaped solids 810 and 820 are located at or near the regions of material 800 where opposing layers respectively of 820 and 810 generally provide less solid material. In this way, embodiment 800 may provide impact or penetration resistance that is generally uniform at different locations in material 800. Like embodiment 100, embodiment 800 includes first and second shaped solids (810, 820) or portions thereof having greatest cross-sectional areas proximate external surfaces of the composite material. In embodiment 800, the greatest cross-sectional area of first and second shaped solids are located at positions in the thickness of material 800 between the respective external surfaces of first and solid shapes 810, 820 and a mid-plane of material 800, closer to their respective external surfaces than to the mid-plane.

Figure 20:
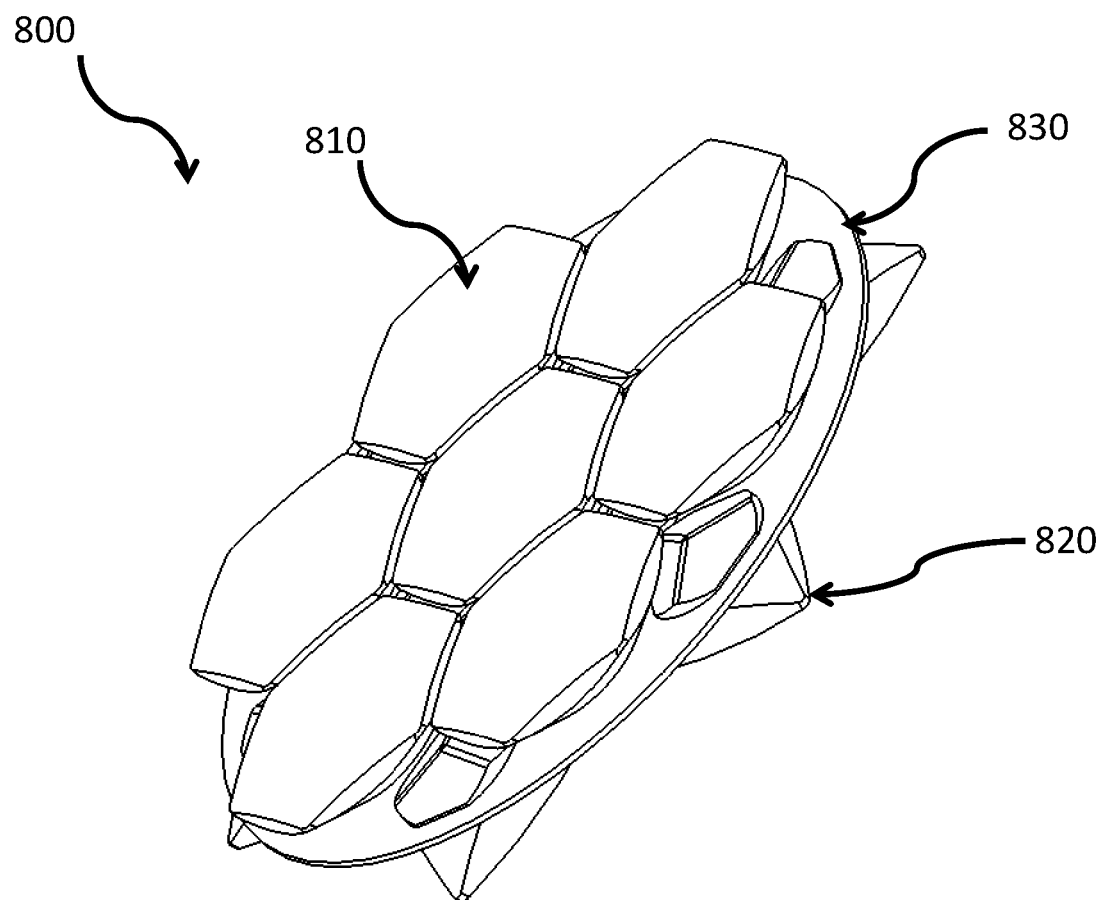
FIGS. 20A-21 are views of an additional embodiment.
Figure 20B:
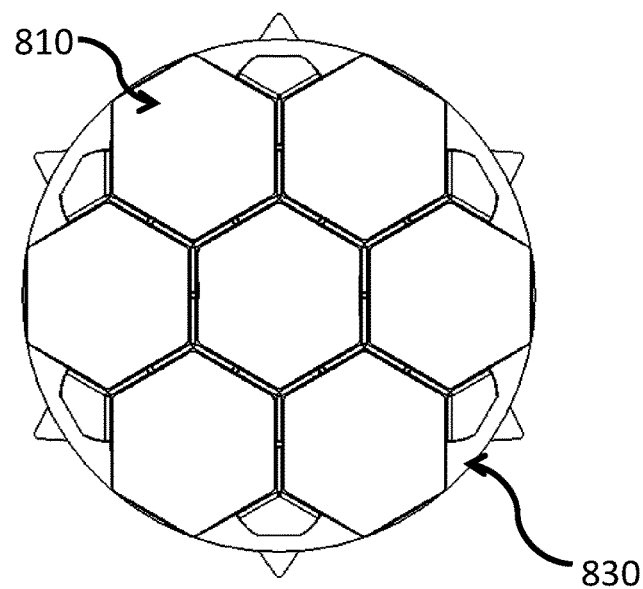
Figure 20C:
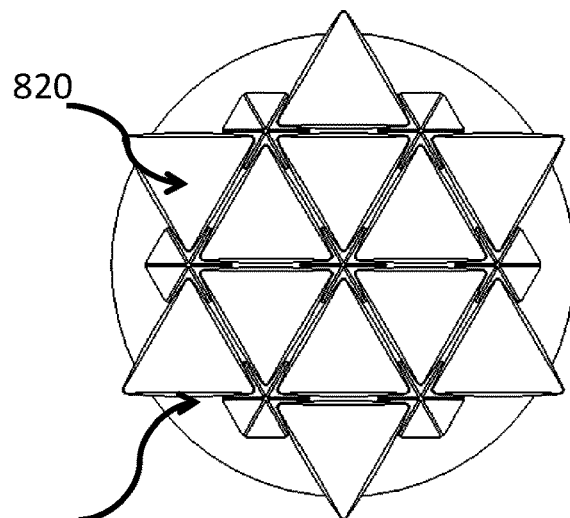
Figure 20D:
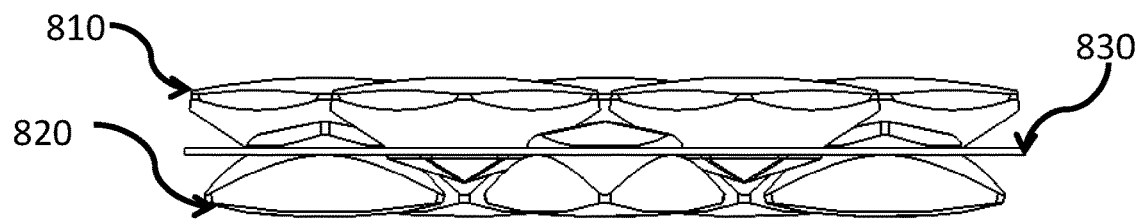

As shown in FIG. 20D, shaped solids 810 and 820 are located proximate to one another, such that portions of each fit within and may partially fill recess created by the repeating patterns of one or the other. In this regard, shaped solids 810 and 820 are sized, shaped and arranged with respect to one another in ways which may maximize the volume of solid material in material 800 for a given thickness, while still allowing desired flexibility. It is also to be noted that like prior discussed embodiments, impact forces applied to a surface of material 800 are transmitted through an impacted shaped solid (e.g., 810) into the shaped solids adjacent the impacted solid shape (e.g., six solid shapes 820 proximate an impacted solid shape 810), thereby distributing impact forces over a greater area than may be achieved in when impacting a comparable solid material of same thickness. Moreover, in embodiments having a layer 830 to which solid shapes 810 and 820 may be attached, impact forces may also be transferred at least partially to such layer 830 in directions generally perpendicular to the applied force. It is further noted that in embodiments 800 having a layer 830, portions of each of solids 810 and 820 may extend through layer 830 (have portions present on either side of layer 830), such that solids 810 and 820 include surfaces on both sides of layer 830 that are adjacent one another forming one or more included angles therebetween.

Like the solid shapes discussed above with respect to embodiment 600, it should be understood that each of solid shapes 810 and 820 may include surfaces (which may be angled, tapered, planar, partially spherical, or rounded) positioned adjacent to similar surfaces of adjacent solid shapes 810 and 820 in the same layer, and may also include surfaces (which may be angled, tapered, planar, partially spherical, or rounded) positioned adjacent to surfaces of adjacent shaped solid 810 and 820 positioned in a separate and/or opposing layer. For example, as shown in FIGS. 20A and 20D, each of solid shapes 810 and 820 includes surfaces that are tapered/conical surfaces and angular planar surfaces adjacent to respective opposing surfaces of adjacent solid shapes 820 and 810. In this regard, solid shape 810 includes a tapered/conical surface adjacent to one of three angular planar surfaces of solid shape 820, and further includes six angled tapered surfaces adjacent to a conical/taped surface of solid shape 820. In other embodiments, each of these references surfaces may be angled, tapered, planar, partially spherical, or rounded.

As noted with respect to embodiment 600 and applicable to embodiment 800, the orientation of such surfaces on each of shaped solid and thereby the included angle formed by such surface and the surface to which it is adjacent to allow for angular displacement of each shaped solid with respect to its neighboring shaped solids (both in the same layer and in an adjacent layer). For example, the surfaces of each first shaped solid 810 facing adjacent first shaped solids 810, as shown in FIG. 20A, form included angles that allow for relative displacement of first shaped solids 810 with respect to other shaped solids 810. Likewise, the surfaces of each second shaped solid 820 facing adjacent second shaped solids 820, as shown in FIGS. 20B, form included angles that allow for relative displacement of second shaped solids 820 with respect to other shaped solids 820. By way of additional example, as shown in FIG. 20D, the surfaces of first shaped solids 810 facing the opposing surfaces of second shaped solids 820 also form included angles, allowing for the relative displacement of each of the plurality of shaped solids with respect to the other.

Figure 21:
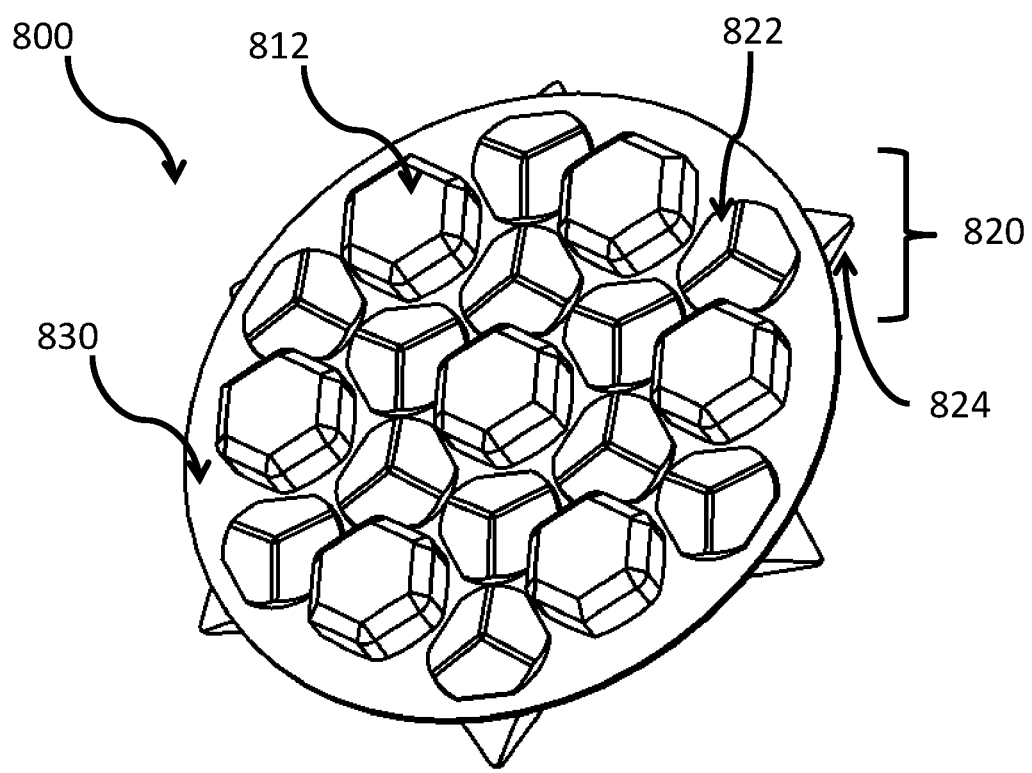

FIG. 21 illustrates an embodiment 800 incorporating teachings discussed above with respect to embodiment 400. First portions 812 of first shaped solids 810 may be connected to layer 830, including for example, by being embedded, molded in or thereto. Likewise, first portions 822 of second shaped solids 820 may be connected to layer 830. Layer 830 may be any material suitable for a layer discussed herein. Second portions of first shaped solids 810 (not shown) and second portions of second shaped solids 820 may then be connected to their respective first portions 812, 822 as described above with respect to embodiment 400.

As with the various embodiments discussed herein, the various features, attributes and variants discussed with respect embodiment 800 may be included as part of other variants discussed herein and vice-versa. For example, embodiment 800 may include interleaved layers of material on one or both external surfaces like layers 660 and 670 discussed above. By way of further example, one or more of the plurality of shaped solids 810 and 820 may be composite structures like those discussed with respect to solid 200 or embodiments 300 and 400, including for example having portions molded/embedded in one or more intermediate layer. Embodiments of material 800 may also include teachings from embodiment 500 and have material(s) like that described with respect to embodiment 500 located in interstices between shaped solids and or attached to the surfaces of such solids. Likewise, other embodiments discussed herein, may incorporate features of embodiment 800, including, for example, generally triangular and/or hexagonal prismatic solids. Moreover, it is understood that solid shapes 810 and 820 may be different sizes and shapes in each opposing repeating layer (allowing, for example, a neutral state following the contours of a non-planar body) and may also be different sizes shapes within each layer (allowing the same).

Figure 22:
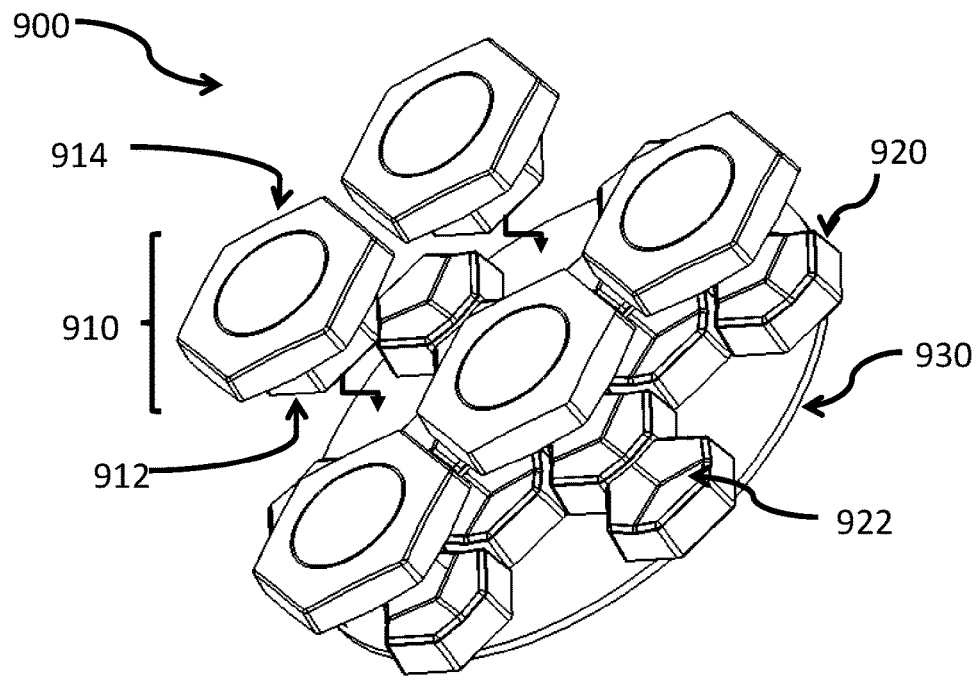
FIGS. 22-24 are views of an additional embodiment.
Figure 23:
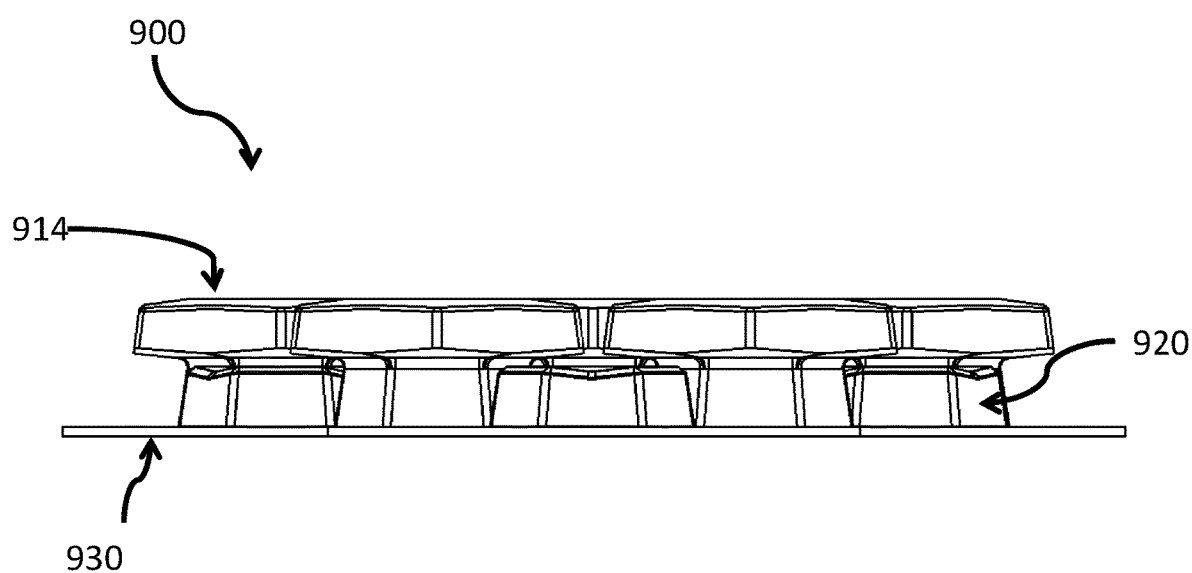
Figure 24:
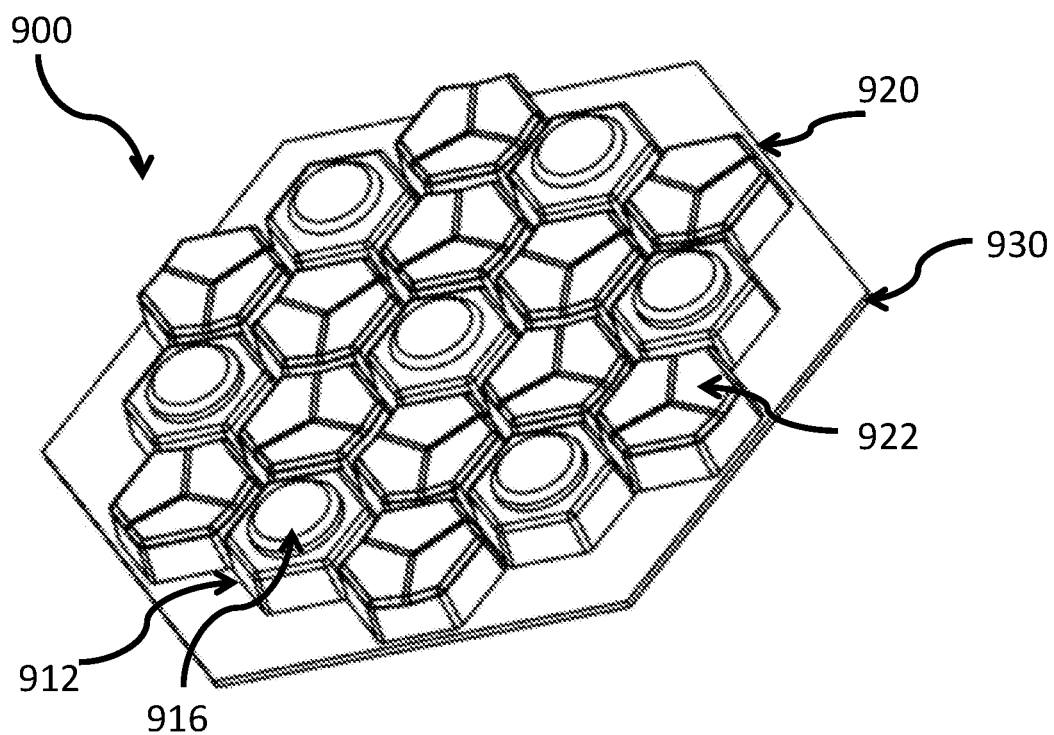

FIGS. 22-24 illustrate embodiment 900, having a plurality of first shaped solids 910, a plurality of second shaped solids 920 and an optional layer 930. First shaped solid 910 includes a generally hexagonal base portion 912 and a generally hexagonal top portion 914 with top portion 914 clocked 30 degrees with respect to base portion 912. Second shaped solids 920 generally have a hexagonal prismatic shape and are arranged in a repeating pattern with each second shaped solid 920 adjacent three other second shaped solids 920 in a layer and generally located around base portion 912 of first shaped solid 910. Second shaped solids 920 further include a plurality of angled surfaces 922 disposed proximate to top portion 914 of first shaped solid 910. As shown, base portion 912 of first solid shape 910 lies generally in the same plane as second shaped solids 920 with top portion 914 overhanging second shaped solids 920 (see FIG. 23). Angled surfaces 922 of second shaped solid 920 are generally located proximate to a corner of each of three top portions 914 at a distance and with an included angle therebetween to allow relative movement between shaped solids 910 and shaped solids 920 as material 900 is moved or flexed out of plane. In addition, base portions 912 and second shaped solids 920 include surfaces that may be angled, tapered, planar, partially spherical, or rounded facing surfaces of second shaped solids 920 and/or base portions 912 and having included angles therebetween to allow relative movement between base portions 912 of first shaped solids 910 and second shaped solids 920. Still further, top portions 914 may include surfaces that may be angled, tapered, planar, partially spherical, or rounded facing surfaces of other top portions 914 and having an included angle therebetween to allow relative movement of first shaped solids 910 with respect to one another. Similar considerations discussed with respect to embodiment 600 apply to the embodiment 900 and the aforementioned surfaces. Like embodiment 100, embodiment 900 includes first and second shaped solids or portions thereof having greatest cross-sectional areas proximate external surfaces of the composite material.

FIG. 24 illustrates an embodiment 900 incorporating teachings discussed above with respect to embodiment 400. First portions of first shaped solids 910, including, for example base portions, 912 of first shaped solids 910 may be connected to layer 930, including, for example, by being embedded, molded in or thereto. In addition, first portions of first shaped solids 910 may include locating or attachment features or structures 916 for the attachment, locating and/or joining second portions of first shaped solid 910, which may include or largely comprise top portions 914 (not shown for clarity). Second shaped solids 920 may also be connected to layer 930. Layer 930 may be any material or material layer discussed herein. Second portions of first shaped solids 910 may be connected to their first portions as described above with respect to embodiment 400.

In embodiment 900, like other embodiments discussed herein, impact forces applied to surfaces of material 900 may be transmitted through an impacted shaped solid (e.g., top portion 914 of first shaped solid 910) into the shaped solids adjacent the impacted solid shape (e.g., base portion 910 of first shaped solid 910 and six solid shapes 920 proximate an impacted top portion 914), thereby distributing impact forces over a greater area than may be achieved in when impacting a comparable solid material of same thickness. Moreover, in embodiments having a layer 930 to which solid shapes 910 and 920 may be attached, impact forces may also be transferred at least partially to such layer 930 in directions generally perpendicular to the applied force.

As with the various embodiments discussed herein, the various features, attributes and variants discussed with respect embodiment 900 may be included as part of other embodiments discussed herein and vice-versa. For example, embodiment 900 may include interleaved layers of material on one or both external surfaces like layers 660 and 670 discussed above. By way of further example, one or more of the plurality of shaped solids 910 and 920 may be composite structures like those discussed with respect to solid 200 or embodiments 300 and 400, including for example having portions molded/embedded in one or more intermediate layer. Embodiments of material 900 may also include teachings from embodiment 500 and have material(s) like that described with respect to embodiment 500 located in interstices between shaped solids and or attached to the surfaces of such solids. Likewise, other embodiments discussed herein, may incorporate features of embodiment 900. Moreover, it is understood that solid shapes 910 (including base and top portions 912 and 914) and 920 may be different sizes and shapes in each opposing repeating layer (allowing, for example, a neutral state following the contours of a non-planar body) and may also be different sizes shapes within each layer (allowing the same).

Figure 25:
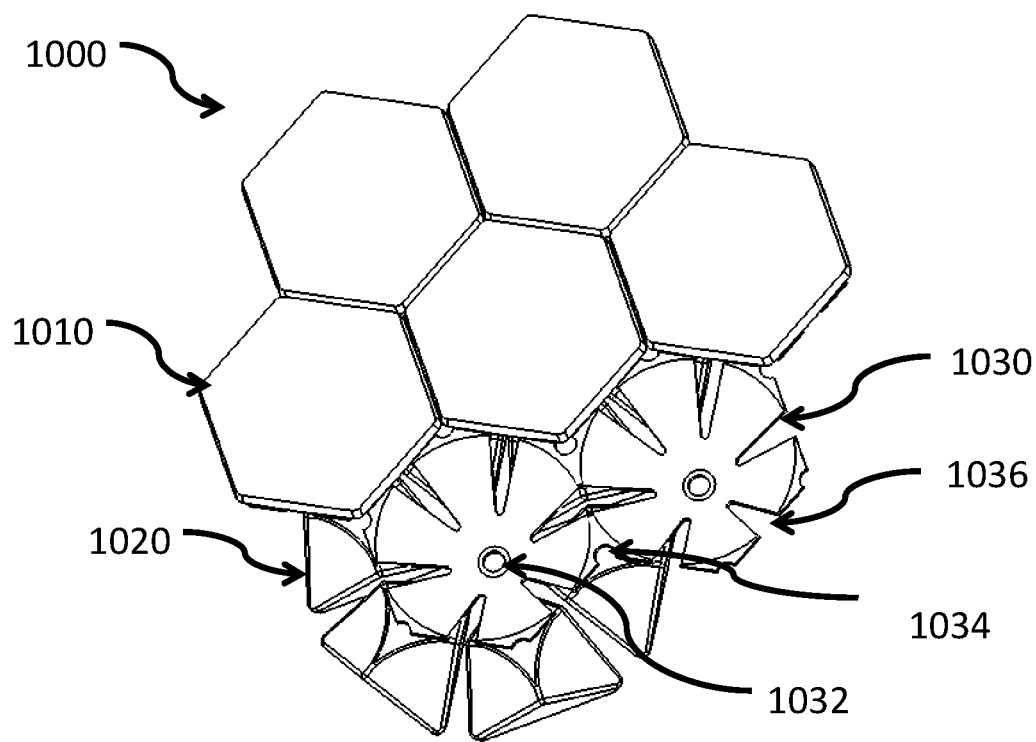
FIGS. 25-26 are views of an additional embodiment.
Figure 26:
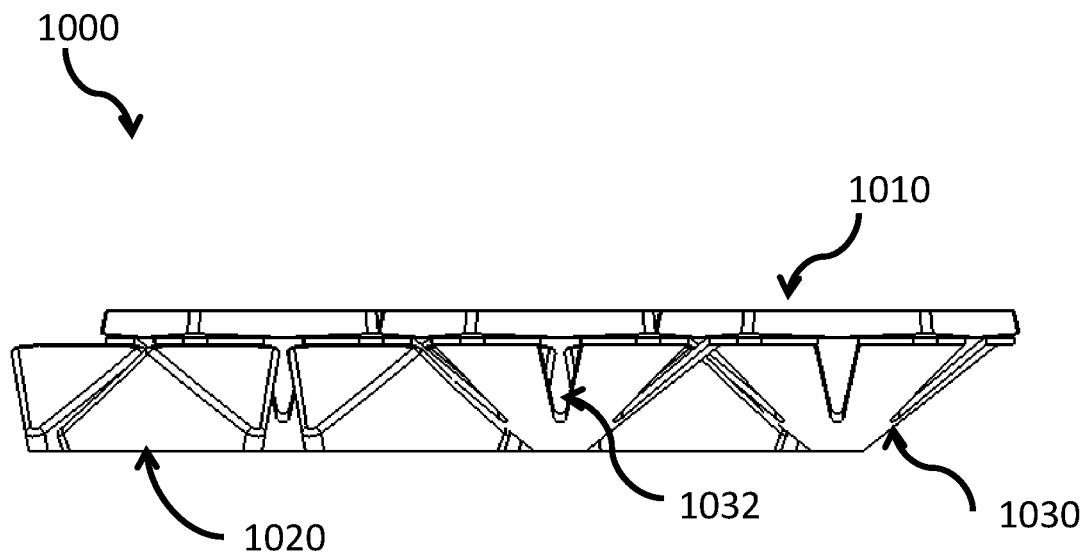

FIGS. 25 and 26 illustrate embodiment 1000, having a plurality of first shaped solids 1010 that having a generally hexagonal prismatic shape and a plurality of second shaped solids 1020 having a generally triangular prismatic shape and a contoured layer 1030. Like embodiment 100, embodiment 1000 includes first and second shaped solids or portions thereof having greatest cross-sectional areas proximate external surfaces of the composite material. First shaped solids 1010 are arranged in a repeating pattern with edges of first shaped solids 1010 adjacent edges of other first shaped solids. As with embodiment 600, such edges/surfaces may form an included angle to allow relative movement between adjacent solids. Second shaped solids 1020 are also arranged in a repeating pattern and are at least partially located within spaces formed by and between first shaped solids 1020. Like embodiment 800, the second shaped solids 1020 are generally located with their centers aligned at or near the region where three corners of shaped solids 1010 come together, and first shaped solids 1010 are generally located with their centers aligned at or near the region where three corners of shaped solids 1020 come together. Second shaped solids 1020 also include surfaces that form included angles with respect to adjacent second shaped solids 1020, like those discussed with respect to embodiment 600, to facilitate movement of second shaped solids 1020 with respect to one another. In addition, shaped solids 1010 and 1020 may include surfaces that form included angles therebetween to allow for relative movement of solids shapes 1010 and 1020 with respect to one another. Contoured layer 1030 is disposed between first and second shaped solids 1010 and 1020, and may be any material discussed herein with respect to material layers. Contoured layer 1030 may include features/structures 1032 and 1034 to align/join and/or connect each of first and second shaped solids 1010 and 1020 to layer 1030. These features/structures may be any of those discussed herein, including for example first portions of one or both first and second shaped solids 1010 and 1020 like the structures discussed with respect to embodiment 400. Contoured layer 1030 may further include openings 1036. Such openings 1036 may facilitate movement of contoured layer 1030, by, for example, avoiding buckling and/or resistance by a portion of contoured layer 1030 as composite material 1000 flexes or bends out of plane, including the forming of a concavity or concave radius.

In embodiment 1000, like other embodiments discussed herein, impact forces applied to surfaces of material 1000 may be transmitted through an impacted shaped solid (e.g., first shaped solid 1010) into the shaped solids adjacent the impacted solid shape (e.g., six solid shapes 1020 proximate an first shaped solid 1010), thereby distributing impact forces over a greater area than may be achieved when a comparable solid material of same thickness is impacted. Moreover, in embodiments having a layer 1030 to which solid shapes 1010 and 1020 may be attached, impact forces may also be transferred at least partially to such layer 1030 in directions generally perpendicular to the applied force.

As with the various embodiments discussed herein, the various features, attributes and variants discussed with respect embodiment 1000 may be included as part of other embodiments discussed herein and vice-versa. For example, embodiment 1000 may include interleaved layers of material on one or both external surfaces like layers 660 and 670 discussed above. By way of further example, one or more of the plurality of shaped solids 1010 and 1020 may be composite structures like those discussed with respect to solid 200 or embodiments 300 and 400, including for example having portions molded/embedded in one or more intermediate layer. Embodiments of material 1000 may also include teachings from embodiment 500 and have material(s) like that described with respect to embodiment 500 located in interstices between shaped solids and or attached to the surfaces of such solids. Likewise, other embodiments discussed herein, may incorporate features of embodiment 1000. Moreover, it is understood that solid shapes 1010 and 1020 may be different sizes and shapes—i.e., each of the plurality of shapes 1010 and 1020 may not all be the same size, shape or have surfaces with the same angular position/orientation that define included angles discussed herein (allowing, for example, a neutral state following the contours of a non-planar body).

Although embodiments have been depicted as planar, embodiments and/or separate components of those embodiments may be non-planar (i.e., contoured forms). In addition, while embodiments and layers thereof have been depicted with regular/uniform spacing between shaped solids, embodiments and/or separate layers of those embodiments may have shaped solids at one spacing and other shaped solids at a different spacing (for example, to accommodate a radius of curvature) of the body or surface on which the material of this invention will be used. In other embodiments, the spacing of shaped solids may be variable or different in different regions to accommodate different radii of the body or surface on which the material of this invention will be used. For example, in an application for use on the torso of a person, some shaped solids may be spaced further apart in a region that is intended to cover an area with a smaller radius of curvature (e.g., shoulder, head, sides) and some shaped solids may be spaced closer together in a region that is intended to cover an area with a larger radius of curvature/flat surface (e.g., front and back of a torso).

It is anticipated that the disclosed embodiments of composite material will have applications in protective clothing and gear, including as body armor, protection for contact sports and high speed activities which can result in serious injuries in the event of impact or crash (e.g., skiing, bicycling, motorcycle riding, skateboarding, etc.). It is anticipated that composite materials discussed herein of will be used together with and as a replacement for existing forms of protective clothing and gear. The disclosed composite material has the advantages of withstanding multiple impacts, flexibility and conformability to body portions and a structure that redirects loads applied to the face of the composite material in directions at least partially normal to the thickness of the composite material. Therefore, it is anticipated that disclosed embodiments of the composite material may be used in lieu of other forms of body protection. In other applications, it anticipated that the composite material may be used in conjunction with existing forms of body protection to provide protection for body areas that require greater movement than permitted by existing materials, for example, to protect areas of body including, but not limited to, the waist wrist, hip, elbow, neck, shoulder, knee and ankle.

The composite material is intended for use in garments including, for example, gloves, vests, jackets, and pants, and may be incorporated into hooded garments, and provide a flexible protection for both the neck and head without the need for a rigid helmet. The composite material may also be incorporated into footwear.

Figure 27:
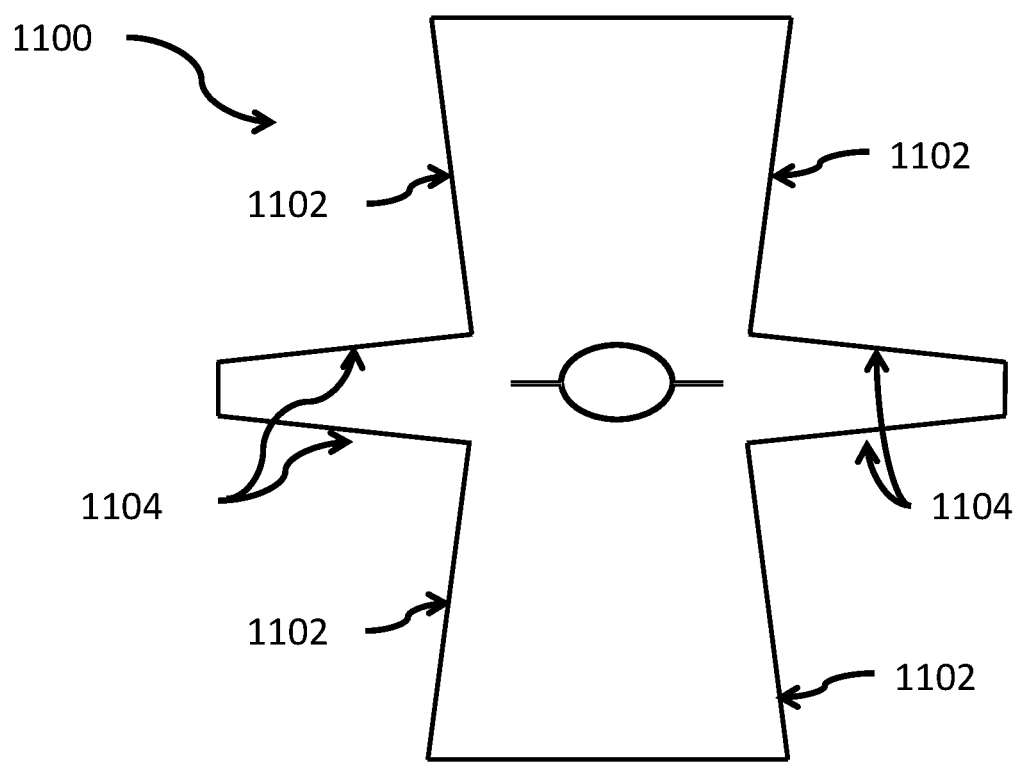
FIG. 27 is a view of an additional embodiment.

As schematically illustrated in FIG. 27, embodiments of composite material can be fabricated in a near-net pattern 1100 suitable for body protection (e.g., torso and arms) that minimizes the need for seams and/or minimizes exposed areas that are not protected by the composite material. In the illustrated embodiment, suitable closures or panels of material (of composite material or of other materials) may be included along the side edges 1102 to allow the body protection to connect at the edges to fit around a torso. In addition, the illustrated embodiment may include suitable panels of material (of composite material or of other materials) to join the respective edges 1104 of the sleeves of the illustrated embodiment to one another. These edges (1102 and 1104, and any other openings and edges) may include quick closures like (hook and loop fasteners, snaps, quick lacing, ties, etc.) to allow rapid donning and doffing of the body protection. Similarly edges or other openings in a garment may have such closure mechanisms and structure. Fabricating near-net pattern body protection may provide improved protection to the wearer by minimizing or eliminating seams and exposed areas that are not protected, as well as providing greater overall coverage and mobility in comparison to existing body protection. Near-net pattern body protection may also provide better fitting body protection, fabricated to closely fit a variety of body shapes (male/female, different builds, etc.) improving the fit and concealment of such body protection. Embodiments may also be used to make body protection with fit and styling of typical clothing, such that it is not readily observable as body protection. While illustrated as a two-dimensional pattern, it is anticipated that near-net patterns 1100 may be fabricated in full three-dimensional molds/patterns and/or as a combination of two and three-dimensional patterns (e.g. include contouring consistent with body shapes (shoulders, chest, torso, etc.) so that as fabricated (i.e., neutral state) the composite material provides a desirable fit to the end user/wearer. In particular, it is understood that an embodiment of near-net pattern 1100 may include aspects of other embodiments discussed herein. For example a near-net pattern 1100 may be made with teachings of embodiment 400 (including those teachings as applied to other embodiments), having an intermediate layer with first portions of solids included as part thereof. A garment according to this near-net pattern 1100 may then be completed or customized for its application by joining second portions of shaped solids (having desired material properties, size, shape, available angular displacement with respect to neighboring solids, etc.) to near-net pattern 1100. Moreover, such garment, may include teachings of embodiment 500 (interstitial material) and embodiment 600 (e.g., interleaved external layers). It is also understood that in applications utilizing the teachings of embodiment 400, near-net patterns may be made according to cut and join/sew techniques, with second portions of shaped solids located and connected after sections of the garment are joined and/or fitted.

The specific embodiments described herein are examples only. The foregoing specification, examples, figures, descriptions and data provide a complete description of the invention, its construction and manufacture. Modifications and combinations of the features, attributes, materials, and methods of manufacture described herein are anticipated to fully practice the invention. The invention is defined by the following claims.

What is claimed is:

1. A composite material comprising:
    a first plurality of shaped solids having a substantially hexagonal cross-section;
    a second plurality of shaped solids having a base and a top, wherein the base has a substantially hexagonal cross-section and the top has a substantially hexagonal cross-section that is larger than the hexagonal cross-section of the base, wherein the top is axially aligned with the base, such that the base and top share a common axis, and wherein in the top is rotated with respect to the base by 30 degrees about the common axis.

2. The composite material of claim 1, wherein a lower surface of the top forms an angle of at least 90 degrees with a side of the base.

3. The composite material of claim 1, wherein an edge of a side of a first shaped solid is aligned with and arranged proximate with an edge of a side of a second shaped solid and the top of the second shaped solid extends over the first shaped solid.

4. The composite material of claim 1, wherein the top comprises a different material than the base.

5. The composite material of claim 4, wherein the top comprises a material having a higher hardness than a material of the base.

6. The composite material of claim 4, wherein the top comprises a material having a greater fracture toughness than a material of the base.

7. The composite material of claim 4, wherein the top is joined to the base by a third material having a lower hardness and higher facture toughness than each of the materials comprising the top and base.

8. The composite material of claim 1, wherein the first and second pluralities of shaped solids are connected to a material layer.

9. The composite material of claim 8, wherein the material layer comprises a resilient material.

10. The composite material of claim 9, wherein the material layer includes a reinforcing fiber.

11. The composite material of claim 1, wherein one of the first and second plurality of shaped solids comprises one of: aluminum oxide, silicon carbide, boron carbide, silicon nitride, silicon-aluminum-oxide-nitride and yttria stabilized zirconia; and wherein the other of the first and second plurality of shaped solids comprises one of: an alloy of titanium, an alloy of aluminum, and an ultra-high-molecular-weight (UHMW) polymer.

12. A composite material comprising:
a first plurality of shaped solids having a substantially hexagonal cross-section;
a second plurality of shaped solids having a base and a top, wherein the base has a substantially hexagonal cross-section and the top has a substantially hexagonal cross-section that is larger than the hexagonal cross-section of the base and is rotated 30 degrees about an axis shared by the base and top;
wherein the first and second pluralities of shaped solids are connected to a material layer and the top of a shaped solid of the second plurality extends over a shaped solid of the first plurality.

13. The composite material of claim 12, wherein the shaped solids of the first plurality taper in cross-section.

14. The composite material of claim 12, wherein each base and each top of the shaped solids of the second plurality taper in cross-section.

15. The composite material of claim 12, wherein each of the plurality of first shaped solids has a minimum height at or near a central axis of the each of the plurality of first shaped solids.

16. The composite material of claim 12, wherein the top comprises a different material than the base.

17. The composite material of claim 16, wherein the top comprises a material having a higher hardness than a material of the base.

18. The composite material of claim 16, wherein the top comprises a material having a greater fracture toughness than a material of the base.

19. A composite material comprising:
a first plurality of shaped solids having a substantially polygonal cross-section with a number of sides (X);
a second plurality of shaped solids having a base and a top, wherein the base has a substantially polygonal cross-section with X number of sides and the top has a substantially polygonal cross-section with X number of sides that is larger than the polygonal cross-section of the base and is rotated X/180 degrees about an axis shared by the base and top;
wherein the top of a shaped solid of the second plurality extends over a shaped solid of the first plurality; and
wherein the top comprises a different material than the base.

20. The composite material of claim 19, wherein the top is joined to the base by a third material having a lower hardness and higher facture toughness than each of the materials comprising the top and base.

* * * * *